United States Patent
Black et al.

(10) Patent No.: US 10,930,041 B2
(45) Date of Patent: Feb. 23, 2021

(54) METHODS AND SYSTEMS FOR HEAD UP DISPLAY (HUD) OF AERIAL REFUELING OPERATION STATUS AND SIGNALING

(71) Applicant: The Boeing Company, Chicago, IL (US)

(72) Inventors: David J. Black, Chicago, IL (US); Roger K. Dang, Chicago, IL (US); Mark S. Malone, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/417,844

(22) Filed: May 21, 2019

(65) Prior Publication Data

US 2019/0272660 A1    Sep. 5, 2019

Related U.S. Application Data

(63) Continuation of application No. 15/678,859, filed on Aug. 16, 2017, now Pat. No. 10,332,294.

(51) Int. Cl.
| | |
|---|---|
| *G06T 11/60* | (2006.01) |
| *G06T 11/00* | (2006.01) |
| *G06T 7/70* | (2017.01) |
| *G02B 27/01* | (2006.01) |
| *B64D 43/00* | (2006.01) |
| *B64D 39/00* | (2006.01) |
| *G06F 3/01* | (2006.01) |

(Continued)

(52) U.S. Cl.
CPC .............. *G06T 11/60* (2013.01); *B64D 43/00* (2013.01); *G02B 27/0101* (2013.01); *G06F 3/012* (2013.01); *G06T 7/73* (2017.01); *G06T 11/00* (2013.01); *G06T 11/001* (2013.01); *H04N 7/18* (2013.01); *B64D 39/00* (2013.01); *G02B 2027/014* (2013.01); *G02B 2027/0138* (2013.01); *G02B 2027/0141* (2013.01); *G06K 9/78* (2013.01); *G06T 7/521* (2017.01); *G06T 7/70* (2017.01); *G06T 2207/10024* (2013.01); *G06T 2207/10028* (2013.01); *G06T 2207/30252* (2013.01); *H04N 5/247* (2013.01)

(58) Field of Classification Search
CPC combination set(s) only.
See application file for complete search history.

(56) References Cited

U.S. PATENT DOCUMENTS

| | | |
|---|---|---|
| 9,067,689 B2 | 6/2015 | Chang |
| 2003/0136874 A1 | 7/2003 | Gjerdrum |

(Continued)

*Primary Examiner* — Wesner Sajous
(74) *Attorney, Agent, or Firm* — McDonnell Boehnen Hulbert & Berghoff LLP

(57) ABSTRACT

Example methods and systems for providing information to a pilot of a receiver aircraft during a refueling operation are described. The refueling operation includes a tanker aircraft with a hose for supplying fuel to the receiver aircraft and a refueling coupler coupled to an end of the hose. One example method includes, receiving at a first transceiver located at the receiver aircraft refueling information from a second transceiver located at the tanker aircraft, receiving from a vision system located at the receiver aircraft image information indicative of the hose and the refueling coupler, and displaying, on a head up display (HUD) of the pilot of the receiver aircraft a visual representation of one or more of the refueling information and the image information.

20 Claims, 12 Drawing Sheets

(51) Int. Cl.
  *G06K 9/78*   (2006.01)
  *H04N 5/247*  (2006.01)
  *H04N 7/18*   (2006.01)
  *G06T 7/73*   (2017.01)
  *G06T 7/521*  (2017.01)

(56) References Cited

U.S. PATENT DOCUMENTS

| | | |
|---|---|---|
| 2006/0000349 A1 | 1/2006 | Cossette |
| 2009/0015436 A1 | 1/2009 | Lundberg et al. |
| 2009/0032711 A1 | 2/2009 | Hewitt et al. |
| 2010/0072320 A1* | 3/2010 | Bartov ............ B64D 39/02 244/135 A |
| 2011/0001011 A1 | 1/2011 | Degiorgis |
| 2013/0020441 A1* | 1/2013 | Peake ............ B64D 45/00 244/135 A |
| 2013/0168497 A1* | 7/2013 | Rix ............ B64D 3/00 244/135 A |
| 2014/0306063 A1* | 10/2014 | Kusnitz ............ B64D 39/04 244/135 A |
| 2014/0346279 A1* | 11/2014 | Foo ............ B64D 39/02 244/135 A |
| 2014/0353430 A1 | 12/2014 | Rix |
| 2014/0358335 A1* | 12/2014 | Sanchez Ruiz ......... B64D 39/00 701/14 |
| 2015/0251769 A1* | 9/2015 | De la Fuente Lopez ......... B64D 39/06 244/135 A |
| 2018/0346315 A1* | 12/2018 | Black ............ B64D 39/04 |
| 2019/0057528 A1 | 2/2019 | Black et al. |

\* cited by examiner

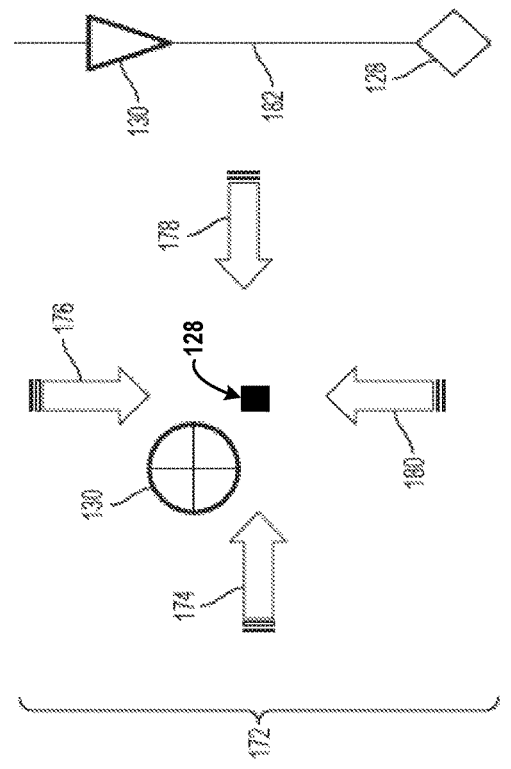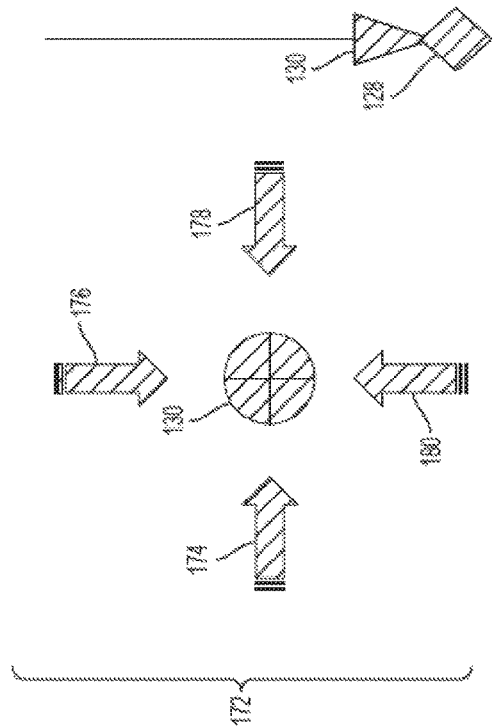
FIG. 3
FIG. 4
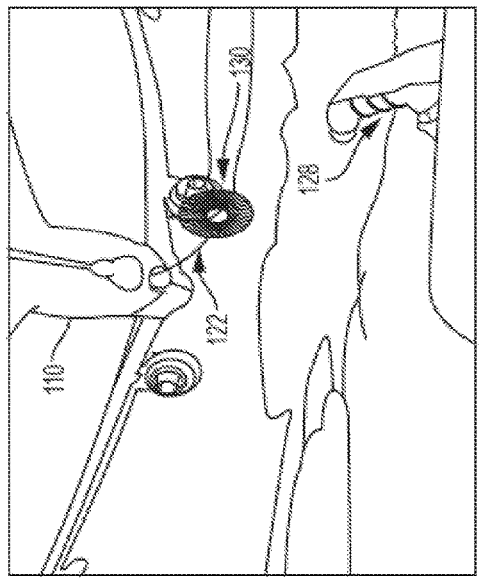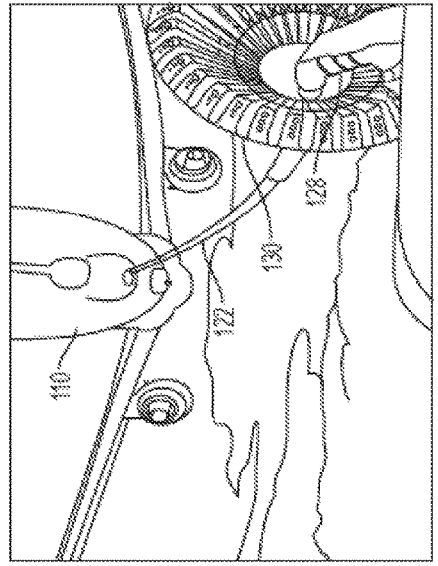

| | Processed vision system data provided to HUD system | | | | | | |
|---|---|---|---|---|---|---|---|
| 1 | Live camera image | | | | | | |
| 2 | Refueling Coupler Position to Receiver Aircraft Probe | | | | | | |
| | Horizontal Position | Vertical Position | Range Distance | Horizontal Velocity | Vertical velocity | Range Velocity | |
| | X | Y | Z | XV | YV | ZV | |

METHODS AND SYSTEMS FOR HEAD UP DISPLAY (HUD) OF AERIAL REFUELING OPERATION STATUS AND SIGNALING

CROSS REFERENCE TO RELATED APPLICATION

The present disclosure claims priority to and is a continuation of U.S. application Ser. No. 15/678,859, filed on Aug. 16, 2017, the entire contents of which are herein incorporated by reference.

FIELD

The present disclosure generally relates to systems and methods for vehicle refueling, and more particularly, to refueling systems and methods for providing indications to a receiver vehicle during refueling operations.

BACKGROUND

During refueling operations, such as aerial refueling operations for example, a tanker aircraft supplies fuel to a receiver aircraft while in-flight. One approach to aerial refueling is known as probe-and-drogue refueling. In a probe-and-drogue system, the tanker aircraft extends a flexible hose having a refueling coupler (commonly referred to as a drogue) disposed at a distal end of the hose. The receiver aircraft has a probe, which the receiver aircraft maneuvers into engagement with the drogue. After the probe couples to the drogue, the tanker aircraft supplies fuel to the receiver aircraft provided the receiver aircraft remains within a predetermined fuel transfer zone.

During an aerial refueling operation, the receiver aircraft is generally responsible for maneuvering relative to the tanker aircraft to couple the probe on the receiver aircraft with the drogue of the tanker aircraft. Once coupled, the receiver aircraft attempts to maintain a position within the fuel transfer zone so that the receiver aircraft can receive fuel at a safe distance of separation from the tanker aircraft. Currently, several pieces of information are required by a pilot of the receiver aircraft when refueling the receiver aircraft during flight. Examples of such information include the distance between the drogue and the tanker aircraft (e.g., fuel transfer zone), a status of the drogue (e.g., engaged with the receiver aircraft), and a status of the tanker (e.g., ready to provide fuel). The flexible hose includes markings at various locations along a length of the hose to indicate the boundaries of a refueling range and the fuel transfer zone. The tanker includes a lighting system, installed on the fuselage of the tanker aircraft that provides indication of the status of the tanker. Accordingly, to successfully perform a refueling operation, the pilot of the receiver aircraft must monitor the status of both the signal lights on the tanker and the markings on the hose to determine the tanker refueling system status and the position of the receiver aircraft relative to the fuel transfer zone in order to maneuver or maintain the receiver aircraft position appropriately to receive fuel from the tanker safely. The pilot monitoring the status of both the signals lights on the tanker and the markings on the hose has many drawbacks including that the markings on the hose may be challenging for the pilot to observe when operating under low-light conditions such as, for example, during night operations and/or during inclement weather. Additionally, the pilot has to continuously shift focus between the hose markings and the tanker lighting system during the refueling operation. Furthermore, at night, the markings on the hose can sometimes be confused with lighting glare giving a false indication. Unfavorable sun angles during daytime and in-contact turns may impose additional challenges to the receiver pilot's workload and safe operations.

What is needed is a centralized and discernible system that provides all information currently available to the receiver aircraft to be displayed for a pilot of the receiver aircraft on a display, such as a head up display (HUD) or a helmet display, so that the pilot only needs to focus on a single point enabling the information to be deciphered quickly and precisely in order to take appropriate actions in a timely manner.

SUMMARY

In an example, a method for providing information to a pilot of a receiver aircraft during a refueling operation is described. A tanker aircraft includes a hose for supplying fuel to the receiver aircraft and a refueling coupler coupled to an end of the hose. The method comprises receiving, at a first transceiver located at the receiver aircraft, refueling information from a second transceiver located at the tanker aircraft, and receiving, from a vision system located at the receiver aircraft, image information indicative of the hose and the refueling coupler. The method also comprise displaying, on a head up display (HUD) of the pilot of the receiver aircraft, a visual representation of one or more of the refueling information and the image information.

In another example, a system for providing information to a pilot of a receiver aircraft during a refueling operation is described. A tanker aircraft includes a hose for supplying fuel to the receiver aircraft and a refueling coupler coupled to an end of the hose. The system comprises a first transceiver located at the receiver aircraft and configured to receive refueling information from a second transceiver located at the tanker aircraft, a vision system located at the receiver aircraft and configured to collect image information indicative of the hose and the refueling coupler, and a processor in communication with the first transceiver to receive the refueling information and in communication with the vision system to receive the image information. The processor is configured to generate a visual representation of one or more of the refueling information and the image information.

In another example, a non-transitory computer readable medium is described, having stored therein instructions, that when executed by one or more processors cause the one or more processors to perform functions for providing information to a pilot of a receiver aircraft during a refueling operation. A tanker aircraft includes a hose for supplying fuel to the receiver aircraft and a refueling coupler coupled to an end of the hose. The functions comprise receiving, from a first transceiver located at the receiver aircraft, refueling information from a second transceiver located at the tanker aircraft, and receiving, from a vision system located at the receiver aircraft, image information indicative of the hose and the refueling coupler. The functions also comprise generating, for display on a head up display (HUD) of the pilot of the receiver aircraft, a visual representation of one or more of the refueling information and the image information.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 3 illustrates example image information received from the vision system and an example visual representation for display on the HUD, according to an example implementation.

FIG. 4 illustrates another example image information received from the vision system and an example visual representation for display on the HUD, according to an example implementation.

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples described herein, methods and systems for providing information to a pilot of a receiver aircraft during a refueling operation are described. A tanker aircraft includes a hose for supplying fuel to the receiver aircraft and a refueling coupler is coupled to an end of the hose. Refueling information can be transmitted from the tanker aircraft to the receiver aircraft. In addition, the receiver aircraft includes a vision system to capture image information indicative of the hose and the refueling coupler and also portions of both the tanker aircraft and the receiver aircraft, and the receiver aircraft can then display a visual representation of the refueling information and/or the image information on a head up display (HUD) of the pilot of the receiver aircraft. The visual representation can provide information such as a location and status of the refueling coupler, and also a distance of the refueling coupler from the tanker aircraft, which is related to whether the receiver aircraft is within a fuel transfer zone (based on a length of the hose extended from the tanker aircraft and a status of a refueling system at the tanker aircraft). While examples are described with respect to aerial refueling, it should be realized that the methods and systems described herein may also be utilized with other types of vehicles such as ships, barges, locomotives, automobiles, etc.

Example methods and systems thus enable providing information to a pilot of the receiver aircraft directly at the HUD of the pilot, which may enable improved pilot situational awareness during low light conditions (e.g., night refueling, turning while coupled). During a known refueling operation, the pilot of the refueling aircraft relies on index markings on the hose that can be difficult to see. But, with examples described herein, providing a status directly on HUD of the pilot reduces pilot workload and allows the pilot of the receiver aircraft to focus on a single point in flight.

Figure 1:
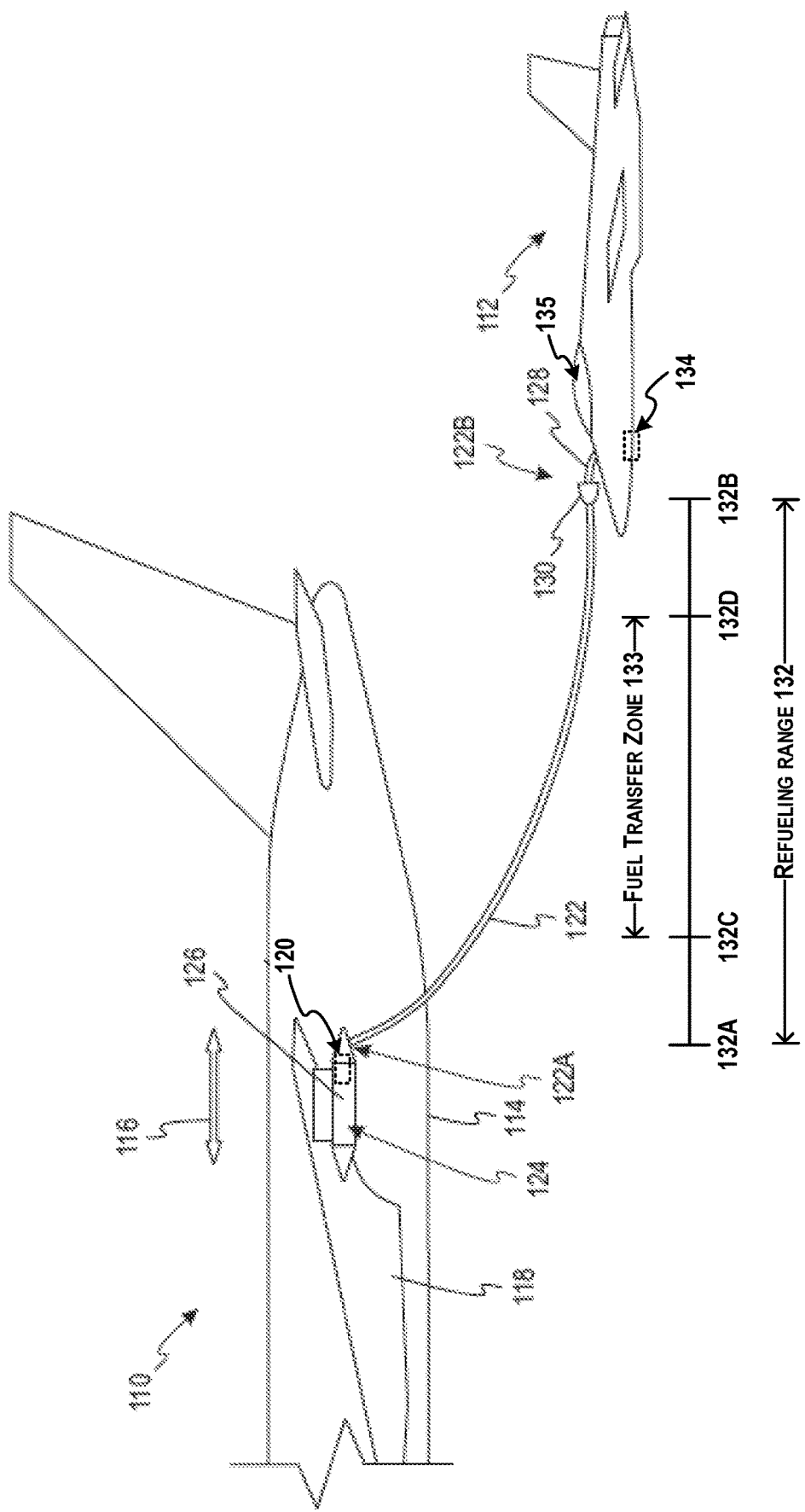
FIG. 1 depicts a partial side view of a tanker aircraft and a receiver aircraft during an aerial refueling operation, according to an example implementation.

Referring now to the figures, FIG. 1 depicts a partial side view of a tanker aircraft 110 and a receiver aircraft 112 during an aerial refueling operation, according to an example implementation. As shown in FIG. 1, the tanker aircraft 110 includes a fuselage 114 that extends in a longitudinal direction 116 and a pair of wings 118 that extend from the fuselage 114 in a transverse direction relative to the longitudinal direction 116. The tanker aircraft 110 also includes a refueling system 120 that is operable to refuel the receiver aircraft 112 in-flight. The refueling system 120, which is shown in more detail in FIG. 2, includes a flexible hose 122 that extends from a housing 124 and is movable relative to the housing 124.

In FIG. 1, the housing 124 is a pod 126, which is coupled to one of the aircraft wings 118. Although FIG. 1 depicts a single pod 126, the tanker aircraft 110 can include one or more pods 126 with a pod 126 being installed on each wing 118 in additional or alternative examples. By providing a pod 126 on each of the wings 118, the tanker aircraft 110 can refuel multiple receiver aircraft 112 at the same time. Additionally or alternatively, the housing 124 from which the hose 122 extends can be provided by a lower portion of the fuselage 114 in other examples.

The hose 122 is configured to supply fuel to the receiver aircraft 112. For example, the hose 122 includes (i) a first end 122A in the housing 124 for receiving the fuel from a fuel tank in the tanker aircraft 110 and (ii) a second end 122B. The second end 122B includes a refueling coupler 130 (which may be referred to as a drogue) that has a conical shape to assist in stabilizing the hose 122 during flight and coupling the hose 122 with a probe 128 of the receiver aircraft 112. In operation, the hose 122 is configured to trail below and aft of the tanker aircraft 110 for coupling with the probe 128 of the receiver aircraft 112

In FIG. 1, the receiver aircraft 112 is in a position that is below and aft of a rear portion of the fuselage 114 of the tanker aircraft 110 to couple to the refueling coupler 130 of the hose 122. A position of the receiver aircraft 112 as shown in FIG. 1 may mitigate or avoid potentially dangerous turbulence and disturbances in air flow created by, for instance, control surfaces and engines of the tanker aircraft 110.

Additionally, FIG. 1 illustrates a refueling range 132 of the refueling system 120. The refueling range 132 is defined between a first-boundary position 132A and a second-boundary position 132B. The first boundary position 132A represents a point where the hose 122 and refueling coupler 130 are fully retracted into the tanker aircraft 110, (e.g. in a stowed position) The second boundary position 132B represents a point where the hose 122 is fully extended from the tanker aircraft 110, referred to as the full trail position. The full trail position is typically a maximum hose length that is extendable from the tanker aircraft 110.

FIG. 1 also illustrates a fuel transfer zone (FTZ) 133 that is defined between points 132C and 132D. The fuel transfer zone 133 represents an area wherein the tanker aircraft 110 is configured to transfer fuel to the receiver aircraft 112. In operation, when the receiver aircraft 112 is within the fuel transfer zone 133, as measured by aerial refueling system hose reel control electronics (described in FIG. 2), fuel is enabled to be transferred if the receiving aircraft 112 is engaged with the refueling coupler 130. More specifically, when the receiver aircraft 112 is within the fuel transfer zone 133, the refueling system 120 can supply fuel to the receiver aircraft 112. The refueling system 120 may not supply fuel to the receiver aircraft 112 when the receiver aircraft 112 is outside of the fuel transfer zone 133. The receiver aircraft 112 may be considered to be in the fuel transfer zone 133 when at least the probe 128 of the receiver aircraft 112 is within the fuel transfer zone 133 and past point 132D, for example. In one example, the fuel transfer zone 133 spans a distance of approximately 50-70 feet. In other examples, the fuel transfer zone 133 may be shorter or longer depending on a size of the aircraft providing fuel, a size of the aircraft being refueled, and/or a length of the refueling hose 122.

The receiver aircraft 112 also includes a vision system 134 for collecting or capturing image information indicative of the hose 122 and the refueling coupler 130. The receiver aircraft 112 may further include a head up display (HUD) (shown in FIG. 2) for a pilot sitting in a cockpit 135 of the receiver aircraft 112 on which a visual representation of one or more of the refueling information and the image information can be displayed.

Figure 2:
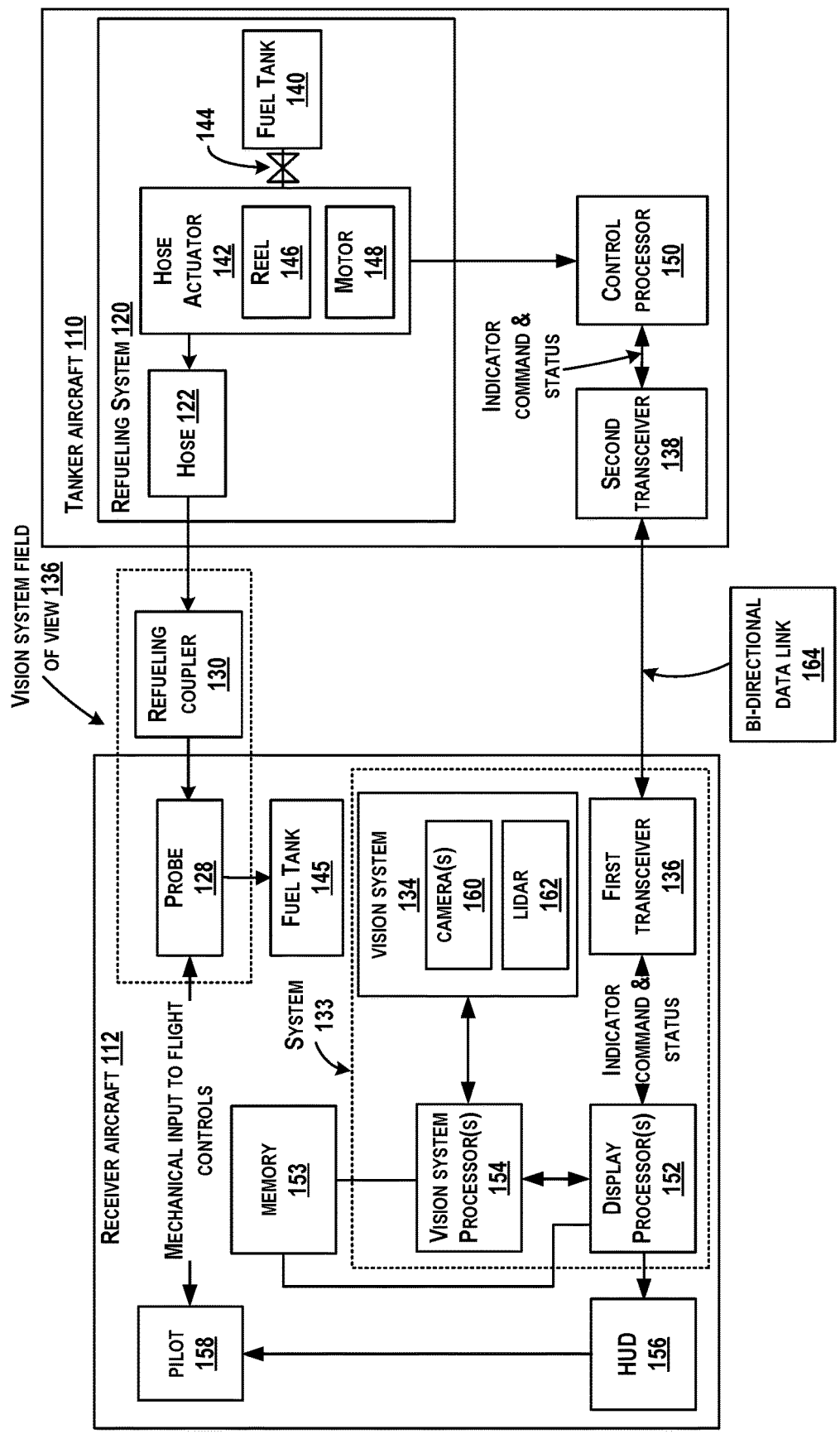
FIG. 2 depicts a block diagram of the tanker aircraft and the receiver aircraft configured for an aerial refueling operation, according to an example implementation.

FIG. 2 depicts a block diagram of the tanker aircraft 110 and the receiver aircraft 112 configured for an aerial refueling operation, according to an example implementation. In one example, a first transceiver 136 is located at the receiver aircraft 112 and a second transceiver 138 is located at the tanker aircraft 110. In operation, the first transceiver 136 is configured to transmit and receive refueling information from the second transceiver 138. Moreover, the second transceiver 138 is configured to transmit and receive refueling information from the first transceiver 136.

The refueling information includes various different types and amount of data. Within examples, the refueling information includes information about a length of the hose 122 deployed during refueling as well as a status of the refueling operation. The status of the refueling operation can include one or more of a tanker refueling system not ready, a refueling system ready, a fuel transfer indication, an emergency separation indication, a quantity of fuel transferred, a fuel transfer completed indication, and a receiver aircraft is clear for disconnect indication, for example.

The information of the length of the hose 122 is transmitted from the tanker aircraft 110 to the receiver aircraft 112. The refueling system 120 of the tanker aircraft 110 includes a fuel tank 140, a motorized hose actuator 142, and one or more valve(s) 144 disposed between the fuel tank 140 and the hose actuator 142. The valve(s) 144 are operable to start and stop the flow of fuel, and/or to increase and decrease a pressure of fuel flow through the hose 122. The hose actuator 142 includes a rotatable hose reel 146 configured to stow the hose 122 and a motor 148 configured to rotate the hose reel 146 to enable the hose 122 to be extended from or retracted into the tanker aircraft 110. The hose actuator 142 moves the hose 122 relative to the housing 124 to extend the hose 122 from the housing 124 (and/or retract the hose 122 into the housing 124 after completion of refueling). The hose actuator 142 operates the motor 148 to rotate the reel 146 on which the hose 122 is wound to extend and retract the hose 122. The reel 146 can be mounted within the housing 124 of the pod 126 and/or the housing 124 in the fuselage 114 of the tanker aircraft 110. The hose actuator 142 is configured to control a position of the hose 122 relative to the housing 124 by controlling the length of hose 122 that is being extended from the housing 124.

The tanker aircraft 110 includes a control processor 150 in communication with the hose actuator 142 to receive the refueling information (e.g., information about a length of the hose 122 deployed during refueling) from the hose actuator 142, and to cause the second transceiver 138 to send the refueling information to the first transceiver 136. The control processor 150 may receive alternative or additional information from the hose actuator 142 as well, such as whether the hose 122 is supplying fuel from the tanker aircraft 110 to the receiver aircraft 112, a pressure of the fuel supplied by the hose 122 to the receiver aircraft 112, a position of the hose 122 relative to the housing 124 responsive to a change in hose slack and length, and/or a tension on the hose 122 when the hose 122 is coupled to the probe 128 of the receiver aircraft 112. Any of this additional information may also be transmitted from the second transceiver 138 to the first transceiver 136 as the refueling information.

The receiver aircraft 112 includes a system 133 for providing image and/or refueling information to a pilot of the receiver aircraft 112 during a refueling operation. The system includes the first transceiver 136, the vision system 134, and one or more processors (e.g., such as a display processor(s) 152 and a vision system processor(s) 154).

The receiver aircraft 112 includes the display processor(s) 152 in communication or coupled to the first transceiver 136 for receiving the refueling information from the first transceiver 136. The receiver aircraft 112 further includes the vision system processor(s) 154 in communication or coupled to the display processor(s) 152 and to the vision system 134. The vision system processor(s) 154 receive image information indicative of the hose 122 and the refueling coupler 130 from the vision system 134, and process the image information for the display processor(s) 152.

The display processor(s) 152 generate a visual representation of one or more of the refueling information and the image information and output the visual representation to a head up display (HUD) 156, which displays for a pilot 158 of the receiver aircraft 112, the visual representation of one or more of the refueling information and the image information. In addition, the display processor(s) 152 may output a status of the refueling operation to the HUD 156 for display as well. The HUD 156 may be a component of a helmet of the pilot 158, for example, or a component of the receiver aircraft 112.

Although only one processor is shown for the display processor(s) 152 and the vision system processor(s) 154, the display processor(s) 152 and the vision system processor(s) 154 may be implemented using more than one processor. In addition, the display processor(s) 152 and the vision system processor(s) 154 may include or have access to a non-transitory computer readable medium (e.g., volatile and/or non-volatile memory) that stores machine language instructions or other executable instructions. The instructions, when executed by the display processor(s) 152 and the vision system processor(s) 154 cause the display processor(s) 152 and the vision system processor(s) 154 to carry out the various operations described herein. As an example, in FIG. 2, a memory 153 is shown in communication with the display processor(s) 152 and the vision system processor(s) 154, which may include a non-transitory computer readable medium, for storing such instructions.

The vision system 134 includes one or more cameras 160 for capturing real-time images of the hose 122, the refueling coupler 130, and portions of both the receiver the tanker aircraft 110 and the receiver aircraft 112. The cameras 160 can capture still images or video. The cameras 160 may include two cameras with one positioned on each side of the receiver aircraft 112. The vision system 134 also includes a LIDAR device 162 (light detection and ranging) for capturing real-time data indicative of the hose 122, the refueling coupler 130, and portions of both the receiver the tanker aircraft 110 and the receiver aircraft 112. Components of the vision system 134 can be mounted on the receiver aircraft 112 such that the probe 128, the refueling coupler 130, and portions of both the receiver the tanker aircraft 110 and the receiver aircraft 112 are in a field of view of the vision system 134, or at least a partial view of the probe 128 is in a field of view of the vision system 134. In one example, the camera(s) 160 can be mounted on upper sides of the receiver aircraft 112 and focused in a forward direction and the LIDAR 162 can be mounted on a top side of the receiver aircraft 112, for example.

The vision system 134 may also include other types of sensors such as Infrared, Visual, Multi-Spectral, Electro-Optical, or other sensors useful to provide data for object tracking, for example.

Within examples, the second transceiver 138 can send, and the first transceiver 136 can receive, refueling information over a bi-directional data link 164. The bi-directional data link 164 may be a wireless data link, and thus, the first transceiver 136 and the second transceiver 138 may include hardware for transmitting and receiving wireless information (e.g., antennas). In other examples, the bi-directional data link 164 may be a wired data link in which a wire may connect the first transceiver 136 and the second transceiver 138. In this example, a wire may run along the hose 122 and connect to the first transceiver 136 through the refueling coupler 130. For a wired connection, communication between the first transceiver 136 and the second transceiver 138 occurs upon connection of the probe 128 to the refueling coupler 130, for example.

In operation, the display processor(s) 152 receives refueling information from the first transceiver 136 and image information indicative of the hose 122 and the refueling coupler 130 from the vision system 134, and then processes all received information for generation of a visual representation to display on the HUD 156. Such information is helpful for the pilot 158 to determine positioning of the receiver aircraft 112 with respect to the refueling coupler 130 to enable fuel transfer from the refueling coupler 130 to the probe 128, and into a fuel tank 145 of the receiver aircraft 112.

FIGS. 3 and 4 illustrate example image information received from the vision system 134 and example visual representations for display on the HUD 156, according to example implementations. In FIG. 3, an image 170 is captured by the camera(s) 160 of the vision system 134. The image 170 is a digital image of a forward view of the receiver aircraft 112 and shows the tanker aircraft 110, the hose 122 and the refueling coupler 130 extending from the tanker aircraft 110, and the probe 128 on the receiver aircraft 112.

The image 170 is processed by the display processor(s) 152 to generate various visual representations. On the right in FIG. 3 is an example visual representation 172 that includes multiple graphics. A first graphic includes four arrows 174, 176, 178, and 180 that represent a location of the refueling coupler 130 with respect to the probe 128. A center of the four arrows 174, 176, 178, and 180 is a location of the probe 128 (as denoted by the square graphic in FIG. 3), and thus, in FIG. 3, the refueling coupler 130 is some distance away from the probe 128. The display processor(s) 152 receive the image 170 and process the image 170 to determine a distance from the receiver aircraft 112 to the refueling coupler 130 (described more fully below) so as to determine a position of the refueling coupler 130 with respect to the four arrows 174, 176, 178, and 180 for display in the visual representation 172. A second graphic on the right in FIG. 3 illustrates a range 182 or distance of the probe 128 to the refueling coupler 130 in a different manner, such as to show a real-time visual illustration of the range 182 as the receiver aircraft 112 approaches the refueling coupler 130.

FIG. 3 illustrates the refueling operation as the receiver aircraft 112 approaches the tanker aircraft 110.

FIG. 4 illustrates a subsequent stage of the refueling operation as the probe 128 of the receiver aircraft 112 makes contact with and engages the refueling coupler 130 of the tanker aircraft 110. In FIG. 4, an image 183 is captured by the camera(s) 160 of the vision system 134. The image 183 is a digital image of a forward view of the receiver aircraft 112 and shows the probe 128 of the receiver aircraft 112 engaged with the refueling coupler 130. The image 183 is processed by the display processor(s) 152 to generate the visual representation 172. On the right in FIG. 4 is the visual representation 172 showing the refueling coupler 130 graphic in a middle of the four arrows 174, 176, 178, and 180, and the second graphic illustrates that the range between the probe 128 and the refueling coupler 130 is zero.

The visual representation 172 helps the pilot 158 maneuver the receiving aircraft 112 to engage the probe 128 with the refueling coupler 130 in low-light conditions where markings on the hose 122 may not be visible, for example.

Figure 5:
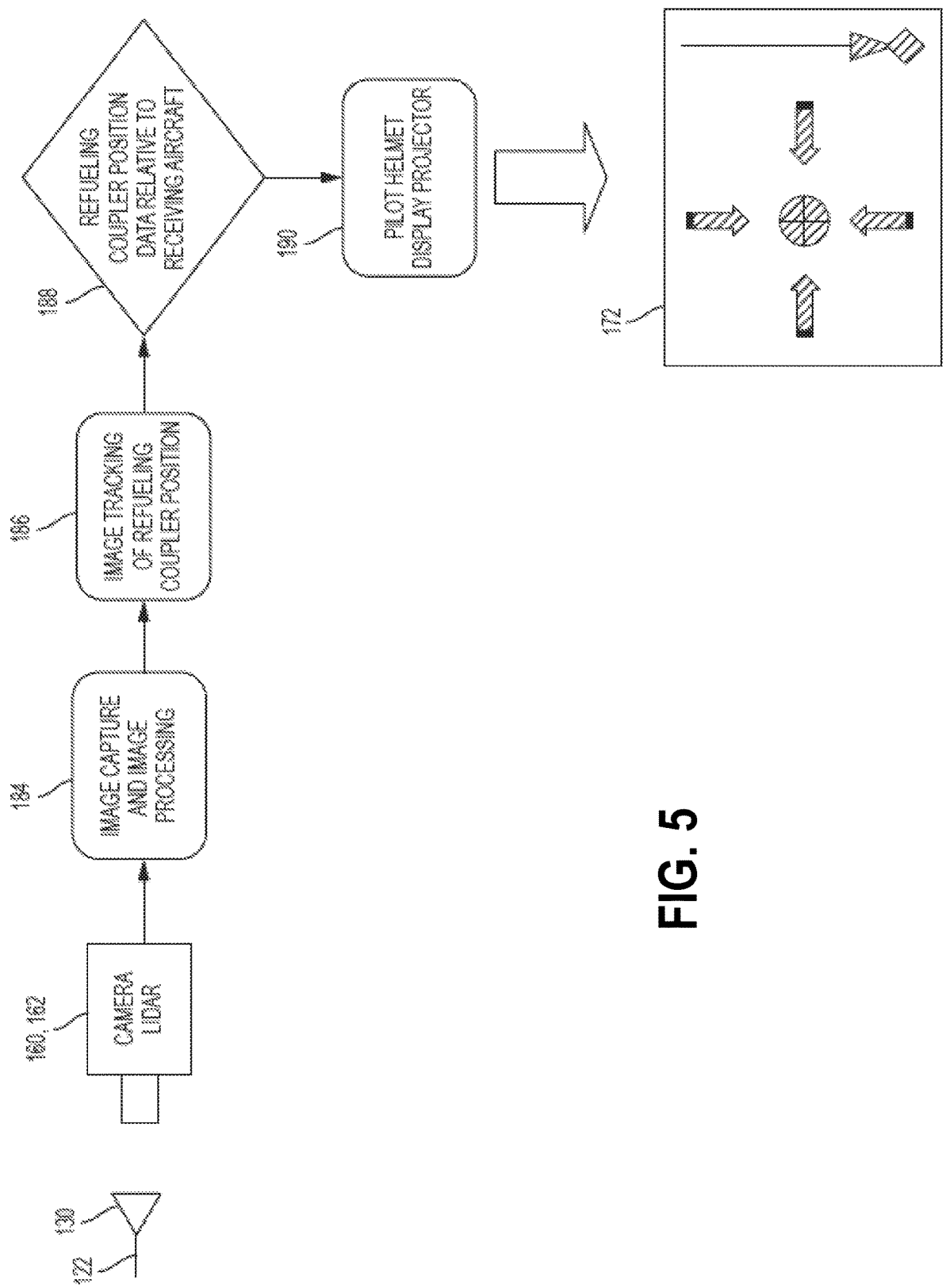
FIG. 5 is a block diagram illustrating an example method of image processing for generation of the visual representation, according to an example implementation.

FIG. 5 is a block diagram illustrating an example method of image processing for generation of the visual representation 172, according to an example implementation. Initially, the camera 160 and/or LIDAR 162 capture images of the refueling coupler 130, the hose 122, and portions of both the tanker aircraft 110 and the receiver aircraft 112, and the captured images are received by the vision system processor(s) 154 for processing, as shown at block 184. Initial processing can include processing the image for conversion to a binary image for feature extraction, or conversion of a color image to grayscale using a thresholding technique making the image a binary image. Feature extraction then can include an edge detection technique to identify objects in the binary image (e.g., as the pixels in the image change from white to black). The initial processing can also include segmentation of foreground target features from the background, which can be achieved through edge/contour detection of the target feature to identify changes in intensity at a boundary of the feature.

Following step 184, image tracking of the refueling coupler 130 position is performed, as shown at block 186. Image tracking can include tracking the same features as extracted from the images over time within each image frame received, and noting a change in position of the features. Alternative image tracking of the refueling coupler 130 can include calculating differences in intensity levels of pixels in an image as compared to surrounding pixels, and as the refueling coupler 130 moves from image frame to image frame, the differences in intensity levels of pixels can be tracked as well.

Within further examples, the vision system 134 and the vision system processor(s) 154 provide motion-based object detection using tracking algorithms such as optical flow, Gaussian mixture models, or others. The memory 153 may store a library database for expected object pattern matching to aid in object acquisition and identification.

The refueling coupler 130 position data relative to the receiving aircraft 112 can also be determined, as shown at block 188. Determining the position data can include computing the refueling coupler 130 horizontal and vertical position as offset from the horizontal and vertical position of the probe 128. Thus, the position of the refueling coupler 130 can be tracked, and the position of the probe 128 can also be tracked within the images, and a distance between the two tracked objects can be determined. Determining the distance between the two tracked object can also include computing range data or a distance of the refueling coupler 130 to the probe 128.

Within further examples, imaging system object detection tracking algorithms produce relative motion derivation including delta XYZ position and change in XYZ position (i.e., rate of closure) measurements between the refueling coupler 130 as observed and the refueling probe 128. Sequential transformations can be performed by the vision system processor(s) 154 between aircraft body axis, vision system sensor axis, refueling probe pointing angle and pilot helmet pointing angle, for example.

Following step 188, as shown at block 190, the HUD 156 can display the visual representation 172 to indicate the position of the probe 128 of the receiver aircraft 112 with respect to the refueling coupler 130.

Figures 6, 7:
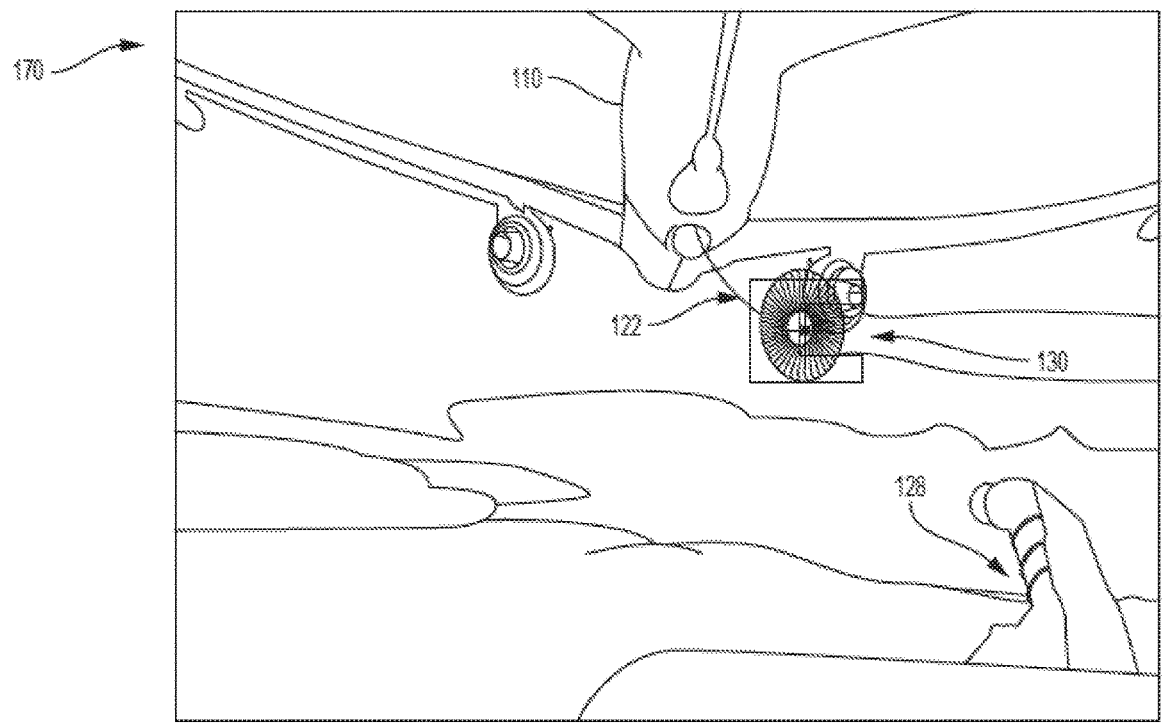
FIG. 6 illustrates an example image captured and used for tracking horizontal, vertical, and range data of the refueling coupler, according to an example implementation.
FIG. 7 illustrates example processed vision system data provided to the HUD, according to an example implementation.

FIG. 6 illustrates an example image captured and used for tracking horizontal, vertical, and range data of the refueling coupler 130, according to an example implementation. FIG. 7 illustrates example processed vision system data provided to the HUD 156, according to an example implementation. In FIG. 7, live camera images are received, for example, as shown in FIG. 6, and the refueling coupler 130 position to the probe 128 of the receiver aircraft 112 is determined to output an x-position (horizontal), y-position (vertical), and z-position (range) of the refueling coupler 130 to the probe 128 of the receiver aircraft 112. In addition, the x-velocity (horizontal), y-velocity (vertical), and z-velocity (range) of the refueling coupler 130 to the probe 128 of the receiver aircraft is output. Thus, the refueling coupler 130 is tracked and the x/y position and velocity data can be determined.

Many different visual representations can be generated based on the image information and refueling information that is received. For example, in some instances, the image information can include an image of a side view of the hose 122, and the image can be processed using image recognition techniques to extract details of the markings on the hose 122. The visual representation 172 can also be generated to include information indicating a length of hose 122 deployed (such as to include text indicating the length) based on the markings on the hose 122 as seen in the image.

In other examples, the side view of the hose 122 may further show a catenary of the hose 122, and thus, the visual representation 172 can be generated to show the catenary of the hose 122. Additional graphics can be generated as well to show a visual image of the tanker aircraft 110, the receiver aircraft 112, and the catenary of the hose 122 coupling the tanker aircraft 110 to the receiver aircraft 112 based on the image of the catenary of the hose 122 for display in the visual representation 172.

Figure 8:
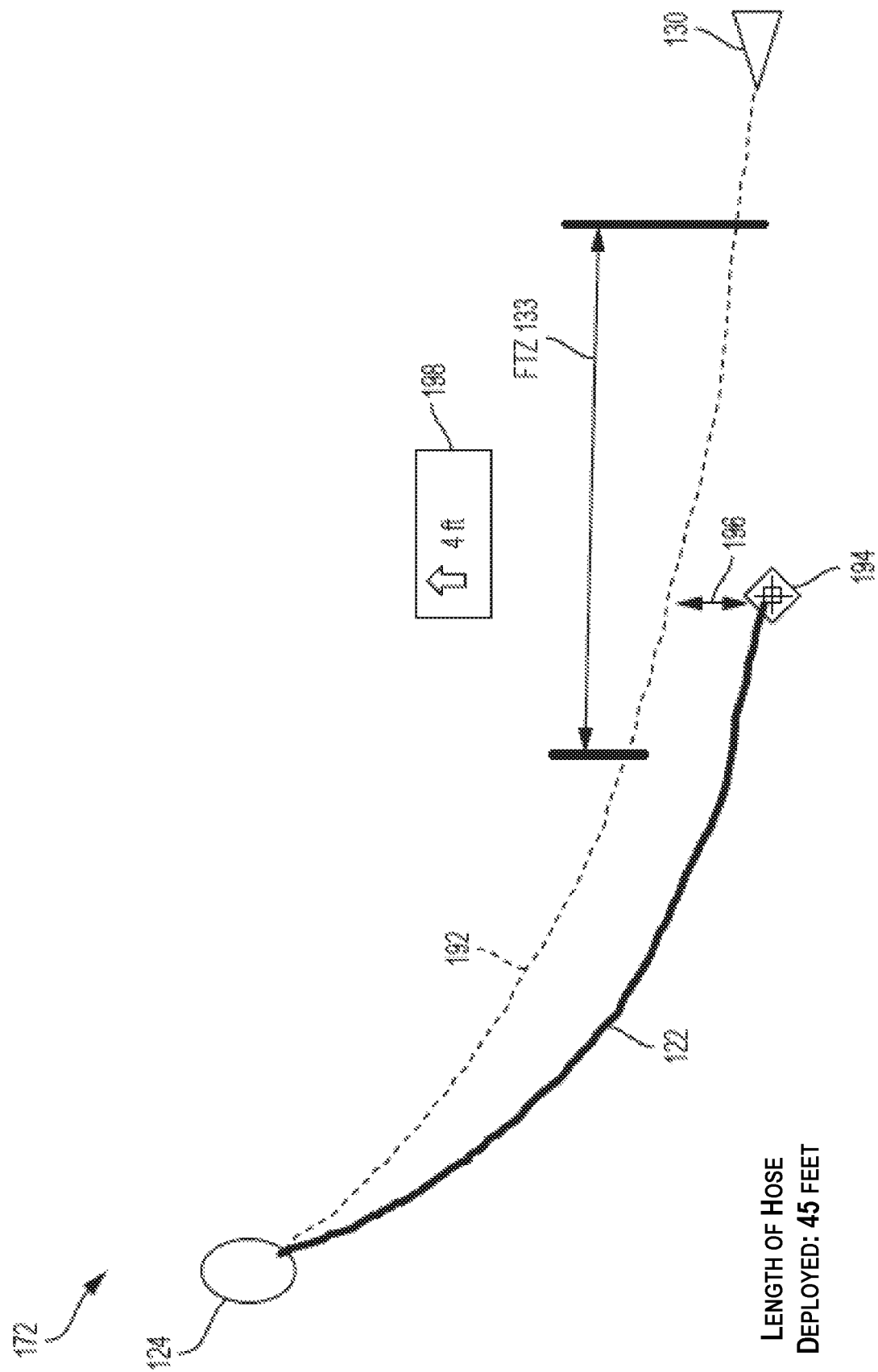
FIG. 8 is an example of the visual representation showing a catenary of the hose, according to an example implementation.

FIG. 8 is an example of the visual representation 172 showing a catenary of the hose 122, according to an example implementation. In this example, initially, the tanker aircraft 110 can transmit a modeled hose catenary 192 to the receiver aircraft 112 (e.g., the second transceiver 138 sends the modeled hose catenary 192 to the first transceiver 136) to be displayed on the HUD 156 as a dashed line. The hose 122 is shown extending from the housing 124 of the tanker aircraft 110, and the model is based on altitude and air speed (of the tanker aircraft 110) during the refueling operation. The model can be retrieved from memory and a number of models are known due to wind tunnel testing, so that once the altitude and air speed are known, an appropriate model can be selected and sent to the receiver aircraft 112. The model is displayed on the HUD 156 as a baseline.

The tanker aircraft 110 also transmits a length of the hose 122 deployed and a hose status to the receiver aircraft 112. The receiver aircraft 112 uses the vision system 134 to calculate an instantaneous position 194 of the receiver aircraft 112 and relative position of the receiver aircraft 112 to the hose position in both graphical and numerical formats. Then, the hose length is used to determine and display the actual catenary (as shown with the solid line) using air speed and altitude data as well, and the instantaneous position 194 can be shown on the display too.

Following, a relative position of the receiver aircraft 112 between the instantaneous position 194 of the receiver aircraft 112 and where the receiver aircraft 112 would be according to the modeled hose catenary 192 can be determined. A position deviation 196 can be determined to show how variation of the actual vs. modeled behavior of the receiver aircraft 112 and a position correction advisory 198 can be determined and illustrated. In this example, a 4 foot increase in altitude of the receiver aircraft 112 is advised to achieve the modeled hose catenary 192 with the receiver aircraft 112 coupled to the refueling coupler 130, for example.

Furthermore, the visual representation 172 illustrates the FTZ 133, and a position of the receiver aircraft 112 with respect to the FTZ 133. Within examples, the vision system processor(s) 154 passes the image data to the display processor(s) 152 which also receives the refueling information comprising a length of the hose 122 that has been deployed from the first transceiver 136. The display processor(s) 152 then can process the image information to determine a position of the receiver aircraft 112 with respect to the FTZ 133 based on the length of the hose 122 that has been deployed and position of the refueling coupler 130 as seen in the image information. Following, the HUD 156 can display the visual representation 172 to indicate the position of the receiver aircraft 112 with respect to the FTZ 133 to help the pilot to maintain a location of the receiver aircraft 112 in the FTZ 133.

Figure 9:
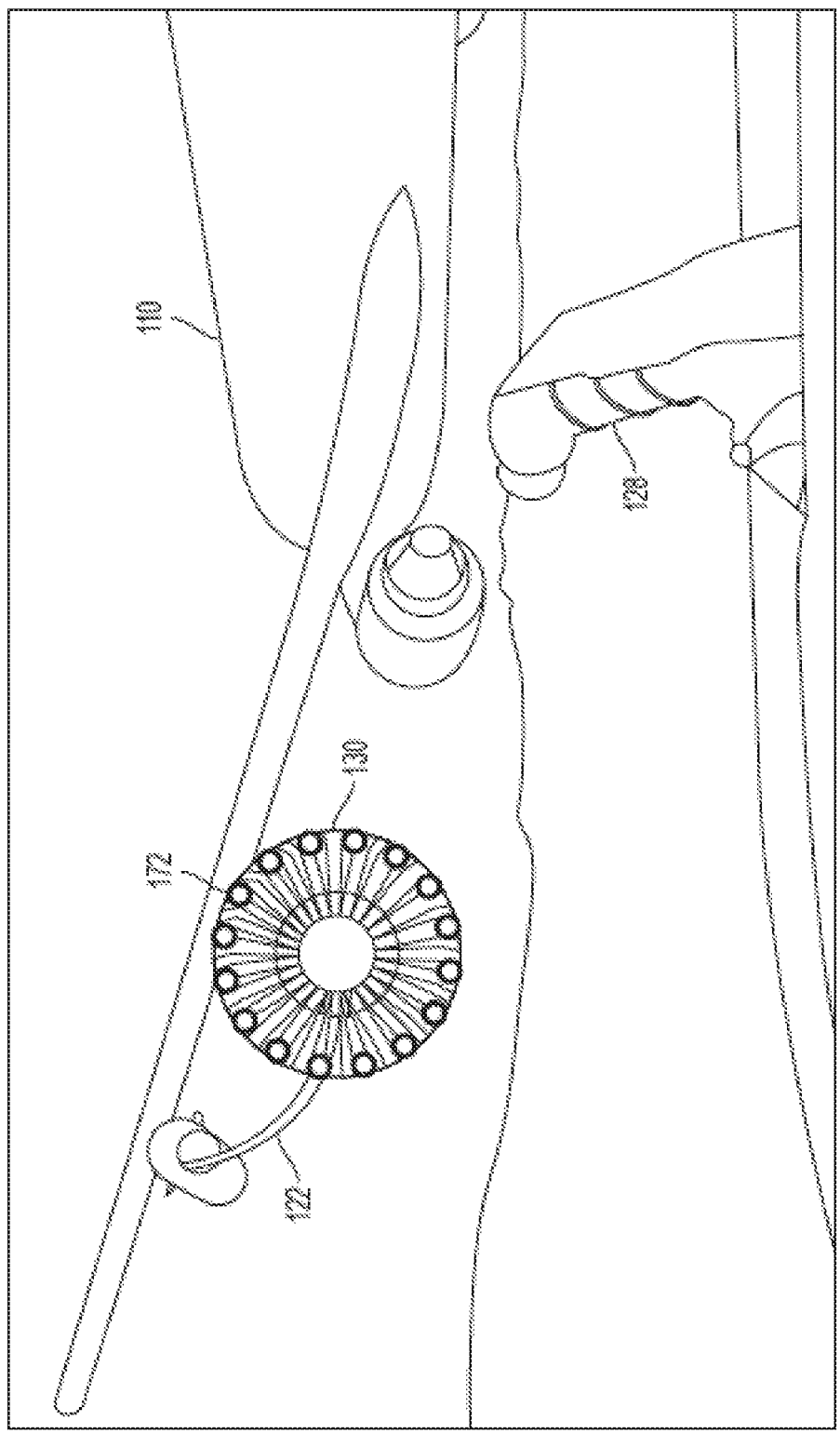
FIG. 9 is an example illustration of a field of view of the pilot with the visual representation overlaid onto a view of the refueling coupler, according to an example implementation.

Within further examples, the HUD 156 of the pilot of the receiver aircraft 112 can display the visual representation 172 overlaid onto a view of the refueling coupler 130 as seen from a field of view of the pilot. FIG. 9 is an example illustration of a field of view of the pilot with the visual representation 172 overlaid onto a view of the refueling coupler 130, according to an example implementation. In this example, the visual representation 172 includes a plurality of virtual light sources overlaid onto the refueling coupler 130 as seen from a field of view of the pilot. The virtual light sources can be overlaid on a peripheral of the refueling coupler 130 to further help illuminate a view of the refueling coupler 130 for the pilot, and one or more of an intensity and color of the plurality of virtual light sources change as an indication of the status of the refueling operation. In further examples, an intensity and/or a color of the plurality of virtual light sources change as an indication of the distance from the receiver aircraft 112 to the refueling coupler 130. Still further, an intensity and/or a color of the plurality of virtual light sources change as an indication of the position of the receiver aircraft 112 with respect to the FTZ 133.

The visual representation 172 may be overlaid onto the refueling coupler 130 as seen from the viewpoint of the pilot by tracking the position of the refueling coupler 130, tracking the position of the head/field of view of the pilot, and mapping the visual representation 172 to a corresponding position overlaid onto the position of the refueling coupler 130. To track the position of the head of the pilot, a helmet worn by the pilot may have a helmet mounted global positioning system (GPS) or inertial measurement unit (IMU) system to establish a helmet view angle. Helmet tracking can also be performed using a magnetic mapping within the cockpit 135 of the receiver aircraft 112 between the helmet and fixed locations to establish a helmet view angle. In further examples, a cockpit-mounted video vision system can be used with helmet mounted targets to establish a helmet view angle. In another example, a close range wide-field LIDAR can be used in the cockpit 135 to establish a helmet view angle.

Within examples, the helmet view angle is relative to the receiver aircraft 112, and a location of the refueling coupler 130 within a field of view of the pilot can be mapped to a location on the HUD 156 of the helmet so as to display the visual representation 172 overlaid onto the refueling coupler 130 as seen from the field of view of the pilot. The mapping includes mapping spatial coordinates of the refueling coupler 130 with movement of the helmet of the pilot, for example.

Within examples in which the visual representation 172 is overlaid onto the field of view of the pilot, many different possibilities exist for graphics that are generated to be overlaid. Some example types of graphics are shown in the following FIGS. 10-15 for a sequence of an example refueling operation. Thus, FIGS. 10-15 depict example aerial refueling operations and corresponding example visual representations for display on the HUD 156 during the refueling operations, according to example implementations.

Figure 10:
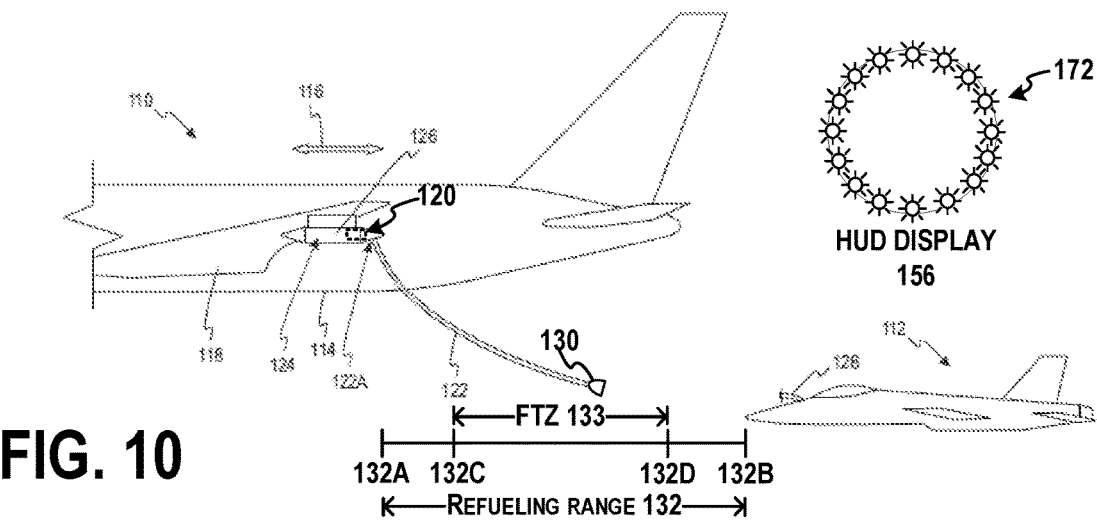
FIG. 10 depicts an example aerial refueling operation and a corresponding example visual representation for display on the HUD display during the refueling operation, according to an example implementation.

FIG. 10 illustrates an example aerial refueling operation beginning with the tanker aircraft 110 initially extending the hose 122 and the refueling coupler 130 from the housing 124. Due to aerodynamic forces, the hose 122 and the refueling coupler 130 trail behind the tanker aircraft 110 below and aft of the fuselage 114. While initially extending the hose 122 and/or otherwise preparing the refueling system 120, control processor 150 of the tanker aircraft 110 can generate refueling information indicating that the refueling system 120 is not ready to couple with the receiver aircraft 112. For example, the not ready state results from the hose 122 not being in a position fully extended to position 132B in the refueling range 132 (e.g., while the hose 122 is initially extended from the housing 124). The control processor 150 sends the information (indicator command and status) to the second transceiver 138, which transmits the information to the first transceiver 136. Accordingly, the display processor(s) 152 receive the refueling information and image information, and generates the visual representation 172 including virtual light sources for display, and the virtual light sources can be a predefined color (e.g., red) and at a predefined intensity setting (e.g., bright setting) so as to indicate that the refueling system 120 is not ready to couple with the receiver aircraft 112. A pilot of the receiver aircraft 112 can view the visual indication of red lights on the refueling coupler 130, and responsively does not attempt to couple with the tanker aircraft 110.

In another example, the refueling system 120 may be placed in a not ready state by the aerial refueling operator (ARO) of the tanker aircraft 110 due to an incomplete reel out/in state. Other examples are also possible.

Figure 11:
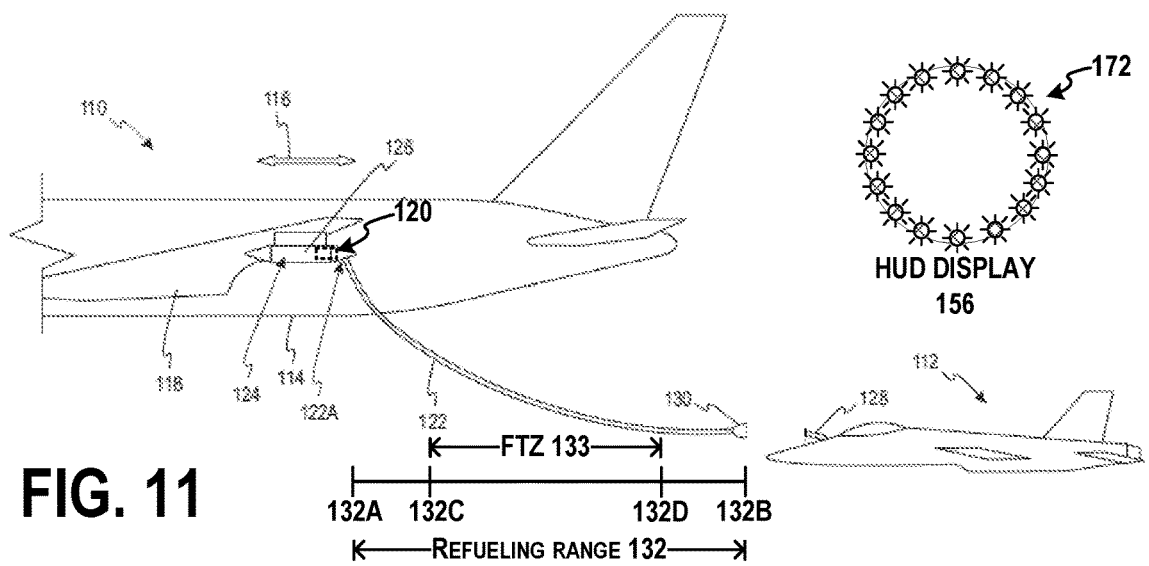
FIG. 11 depicts another example aerial refueling operation and a corresponding example visual representation for display on the HUD display during the refueling operation, according to an example implementation.

Next, as shown in FIG. 11, the hose actuator 142 completes extending the hose 122 and the refueling coupler 130 to a fully extended position 132B (e.g., full trail position) of the refueling range 132 at which point the refueling system 120 is ready to couple to the receiver aircraft 112. Thus, the control processor 150 can determine a length of the hose 122 that has been deployed, for example, by monitoring the reel 146 and the motor 148 of the hose actuator 142 during deployment. The reel 146 stores the hose 122 in a stowed position, as the hose is deployed, the reel 146 turns, and a number of turns/rotations of the reel 146 determines the length of the hose 122 deployed. The length of the portion of hose 122 that is extended from the tanker aircraft 110 may be 75 feet, and an acceptable refueling range can be established once the hose 122 has been deployed between about 50-70 feet.

The control processor 150 sends the refueling information including the length of the hose 122 deployed to the second transceiver 138, which transmits the refueling information to the first transceiver 136. Accordingly, the display processor(s) 152 receive the refueling information and image information, and generates the visual representation 172 including virtual light sources for display, and the virtual light sources can be at a bright setting and a different color (such as yellow) to inform the pilot of the receiver aircraft 112 that he can approach and couple to the refueling coupler 130.

Figure 12:
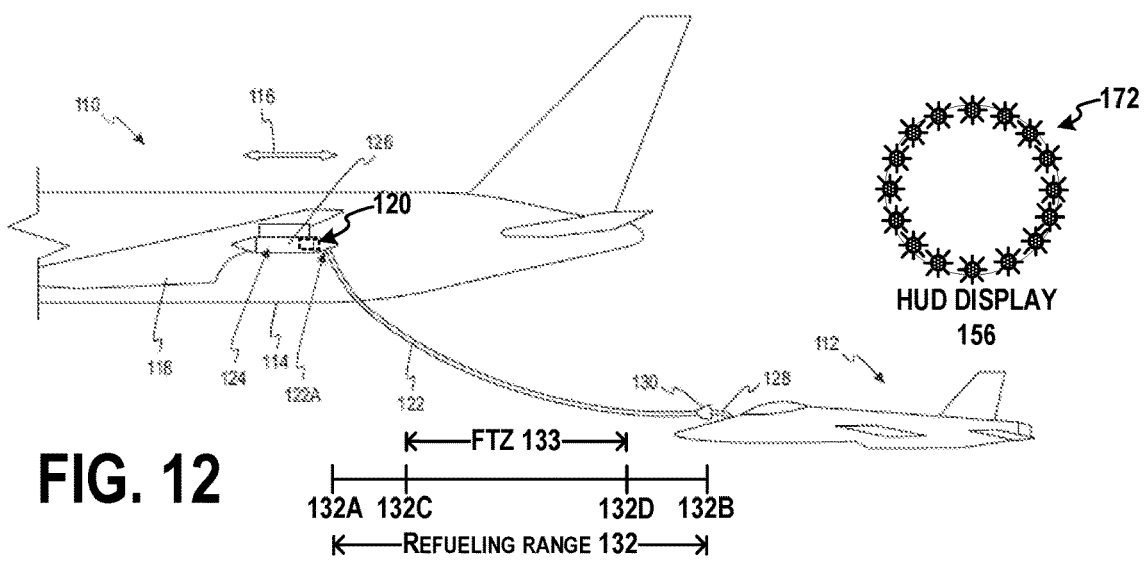
FIG. 12 depicts another example aerial refueling operation and a corresponding example visual representation for display on the HUD display during the refueling operation, according to an example implementation.

Responsive to this indication, the receiver aircraft 112 maneuvers into a position to enable the probe 128 to engage with the refueling coupler 130, as shown in FIG. 12. In operation, once the probe 128 contacts the refueling coupler 130, the vision system processor(s) 154 can process image information to determine that contact has been made, and the display processor(s) 152 receive the refueling information and image information, and generates the visual representation 172 including virtual light sources for display. Here, the virtual light sources may include a dim setting at yet a different color (such as green).

Figure 13:
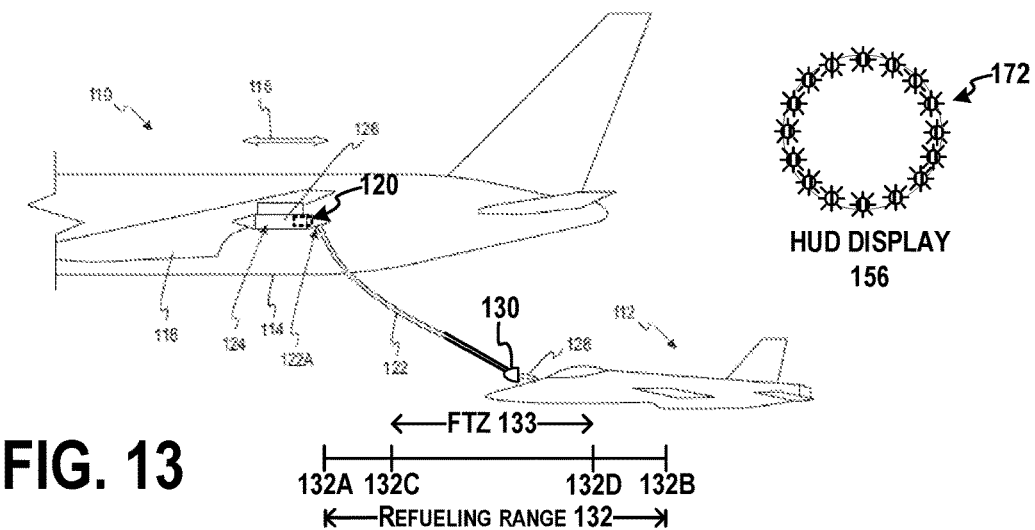
FIG. 13 depicts another example aerial refueling operation and a corresponding example visual representation for display on the HUD display during the refueling operation, according to an example implementation.

After the probe 128 is coupled to the refueling coupler 130, the receiver aircraft 112 can continue to urge the refueling coupler 130, and thus the hose 122, forward toward the tanker aircraft 110 until the receiver aircraft 112, and more particularly the refueling coupler 130, is in the fuel transfer zone 133. For example, as shown in FIG. 13, after the receiver aircraft 112 is coupled to the refueling coupler 130, the receiver aircraft 112 pushes the refueling coupler 130 past point 132D into the fuel transfer zone 133. While the refueling coupler 130 is inside the fuel transfer zone 133, the receiver aircraft 112 can receive fuel, whereas while the refueling coupler 130 is outside the fuel transfer zone 133, the receiver aircraft 112 cannot receive fuel.

The hose reel 146 maintains tension on the hose 122 to reduce slack as the receiver aircraft 112 pushes the refueling coupler 130 into the fuel transfer zone 133. The control processor 150 sends the refueling information including the length of the hose 122 deployed to the second transceiver 138, which transmits the refueling information to the first transceiver 136. Accordingly, the display processor(s) 152 receive the refueling information and image information, and generates the visual representation 172 including virtual light sources for display, and the virtual light sources can at a predefined pattern to inform the pilot of the receiver aircraft 112 that the receiver aircraft 112 is in the fuel transfer zone 133. An example predefined pattern to inform that the receiver aircraft 112 is in the fuel transfer zone 133 is shown in FIG. 13.

If the receiver aircraft 112 starts to drift somewhat during the refueling operation, such that the receiver aircraft 112 is approaching the distal limit of the fuel transfer zone, i.e. point 132D, the visual representation 172 can be updated to inform the pilot. More specifically, as a distance between the receiver aircraft 112 and the tanker aircraft 110 increases, the length of the portion of hose 122 that is being extended from the tanker aircraft 110 also increases. Conversely, as a distance between the receiver aircraft 112 and the tanker aircraft 110 decreases, the length of the portion of hose 122 that is being extended from the tanker aircraft 110 also decreases. Accordingly, the display processor(s) 152 receive information indicative of the length of the hose 122 being extended from the tanker aircraft 110, and determines, in real-time, whether the receiver aircraft 112 is moving in a direction that may result in the receiving aircraft 112 exiting the fuel transfer zone 133. As a result, the display processor(s) 152 generate corresponding graphics for the visual representation 172 to inform the pilot of the receiver aircraft 112 to move inward toward the tanker aircraft 110 such that the receiver aircraft 112 is maintained within the fuel transfer zone 133.

Figure 14:
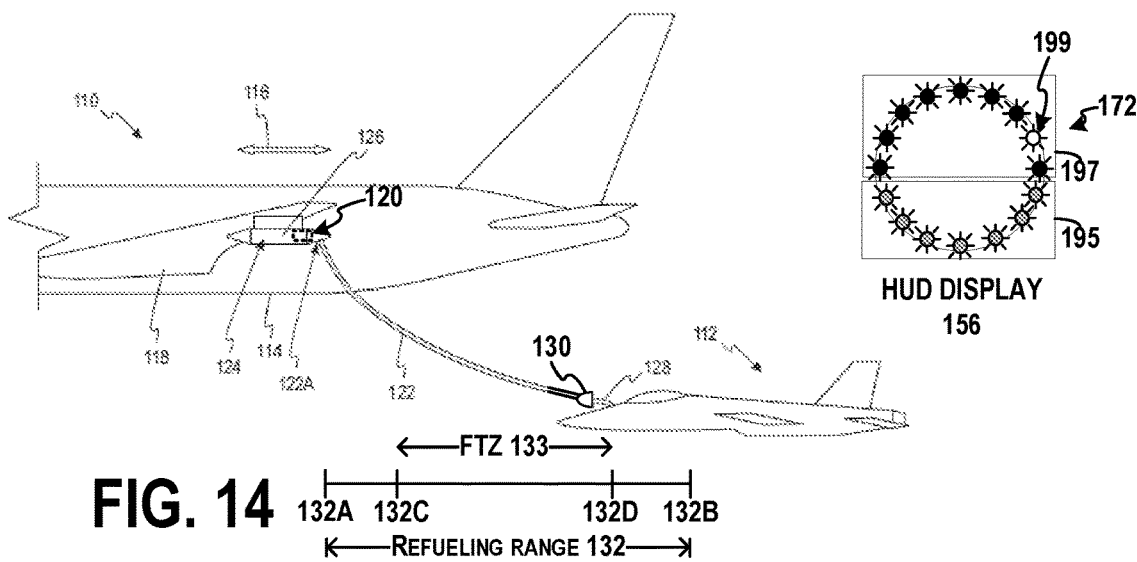
FIG. 14 depicts another example aerial refueling operation and a corresponding example visual representation for display on the HUD display during the refueling operation, according to an example implementation.
Figure 15:
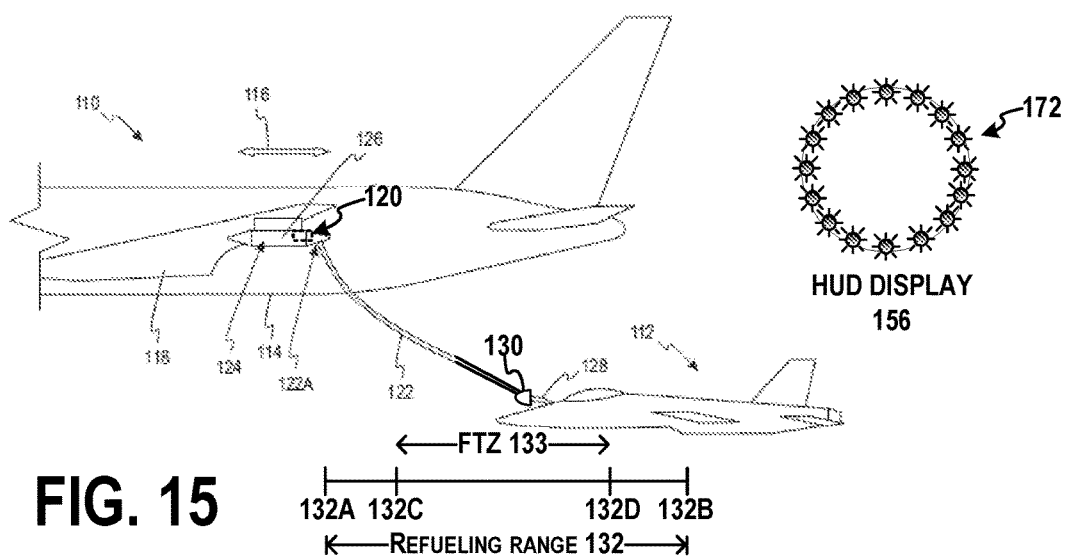
FIG. 15 depicts another example aerial refueling operation and a corresponding example visual representation for display on the HUD display during the refueling operation, according to an example implementation.

In other examples, such as shown in FIG. 14, the visual representation 172 to be overlaid onto the refueling coupler 130 in the pilot's field of view can be generated to provide a different visual indication to inform the pilot of the receiver aircraft 112, after contact is made between the probe 128 and the refueling coupler 130, of a position of the receiver aircraft 112 with respect to the fuel transfer zone 133. For example a bottom portion 195 of the virtual light sources are illuminated in a first color (e.g., yellow) and intensity, a top portion 197 of the virtual light sources are illuminated in a second color (e.g., green) and intensity, and one virtual light source 199 is illuminated in a third color (e.g., white) and intensity to indicate a position of the receiver aircraft with respect to the fuel transfer zone 133. When the receiver aircraft is in the fuel transfer zone 133, one of the virtual light sources in the top portion 199 is illuminated white (e.g., the virtual light source 204). A position of a virtual light source in the top portion 199 that is illuminated white depends on a position of the receiver aircraft 112 with respect to points 132C and 132D of the fuel transfer zone 133. As the receiver aircraft 112 approaches end points 132C and 132D of the fuel transfer zone 133, the virtual light source in the top portion 199 that is illuminated white moves from left to right, and if the receiver aircraft 112 falls out of the fuel transfer zone 133, a virtual light source in the bottom portion 195 is illuminated white. Thus, the virtual light sources on the bottom portion 195 and the top portion 197 used in the visual representation 172 to inform the pilot of the receiver aircraft 112 of relative positioning of the receiver aircraft 112 in the fuel transfer zone 133.

Once the refueling system 120 is supplying fuel to the receiver aircraft 112, the control processor 150 generates refueling information and sends the information (indicator command and status) to the second transceiver 138, which transmits the information to the first transceiver 136. The display processor(s) 152 can then generate the visual representation 172 to be a pattern that informs the pilot of the receiver aircraft 112 that fuel is being transferred, such as the example pattern shown in FIG. 15 to be overlaid onto the refueling coupler 130 within the field of view of the pilot.

Within additional examples, the refueling information can include an indication of a quantity of fuel transferred to the receiver aircraft 112, and the display processor(s) 152 can generate corresponding graphics to be included in the visual representation 172 that represent the quantity of fuel transferred. The first transceiver 136 can receive information indicating the quantity of fuel transferred from the second transceiver 138 in the tanker aircraft 110, and send the information to the display processor(s) 152.

Once transfer of fuel is completed, the control processor 150 sends the information (indicator command and status) to the second transceiver 138, which transmits the information to the first transceiver 136. Accordingly, the display processor(s) 152 generate graphics to be included in the visual representation 172 that informs the pilot of the receiver aircraft 112 of a fuel transfer completed indication, and a receiver aircraft is clear for disconnect indication.

The example graphics shown for the HUD 156 in FIGS. 10-15 are illustrated using different shading, and the shading may be representative of a specific color and/or intensity of a graphic to be overlaid onto the refueling coupler 130 in the pilot's field of view. In addition, the different patterns and visual indications illustrated by the virtual light sources in FIGS. 10-15 represent example different visual indications to be displayed at the corresponding different sequential points during the aerial refueling operations. Fewer or additional visual indications may be used, as needed, to inform of fewer or additional sequential points during the refueling operations, and/or to inform of additional information during the refueling operations.

Example methods and systems described herein use information from the vision system 134 to help inform the pilot of the receiver aircraft 112, prior to making contact with the refueling coupler 130, of distance/range to the refueling coupler 130. Information transmitted from the tanker aircraft 110 to the receiver aircraft 112 (e.g., length of hose 122 deployed) is also useful for this determination. Then, after making contact of the probe 128 to the refueling coupler 130, information from the vision system 134 and refueling information transmitted by the tanker aircraft 110 helps inform of the status of the refueling operation. Finally, once refueling is complete, information from the vision system 134 is help to enable a disconnect, such that when the receiver aircraft 112 is backing out, the pilot may disconnect in a manner to avoid dragging the hose 122 down or up so that the hose 122 does not swing away "to leave the refueling coupler 130 where it was found".

FIGS. 16-26 are flowcharts that illustrate example methods for providing information to the pilot 158 of the receiver aircraft 112 during a refueling operation, according to example implementations.

Figure 16:
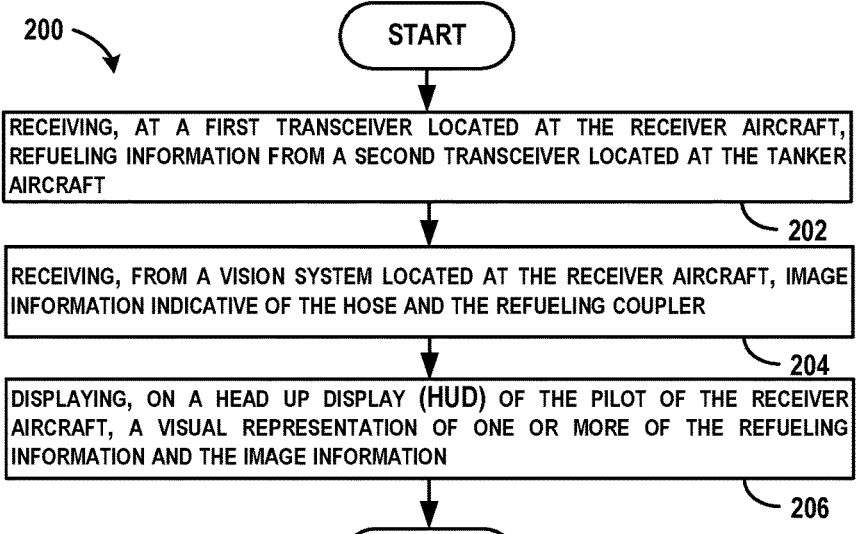
FIG. 16 is a flowchart that illustrates an example method for providing information to the pilot of the receiver aircraft during a refueling operation, according to an example implementation.

In FIG. 16 a method 200 includes blocks 202-206. At block 202, the method 200 includes receiving, at the first transceiver 136 located at the receiver aircraft 112, refueling information from the second transceiver 138 located at the tanker aircraft 110.

At block 204, the method 200 includes receiving, from the vision system 134 located at the receiver aircraft 112, image information indicative of the hose 122 and the refueling coupler 130, and both planes as noted above. In one example, receiving the image information includes receiving from the camera 160 real-time images of the hose 122 and the refueling coupler 130. Real-time images include images captured at a present point in time during the refueling operation. In another example, receiving the image information includes receiving real-time data indicative of the hose 122 and the refueling coupler 130 from the LIDAR 162. In further examples, receiving the image information includes receiving real-time data indicative of the hose 122 and the refueling coupler 130 from the camera 160 and from the LIDAR 162.

At block 206, the method 200 includes displaying, on the head up display (HUD) 156 of the pilot 158 of the receiver aircraft 112, the visual representation 172 of one or more of the refueling information and the image information. For example, displaying the visual representation includes generating, for display on the HUD 156 of the pilot 158 of the receiver aircraft 112, the visual representation 172 of one or more of the refueling information and the image information. Within examples, the refueling information includes a status of the refueling operation including one or more of a tanker refueling system not ready, a refueling system ready, a fuel transfer indication, an emergency separation indication, a quantity of fuel transferred, a fuel transfer completed indication, and a receiver aircraft is clear for disconnect indication. In this example, the method 200 includes displaying, via the visual representation 172, the status of the refueling operation. In some examples, the image information includes an image of a catenary of the hose 122, and the method 200 includes displaying, via the visual representation 172, the catenary of the hose 122.

Figure 17:
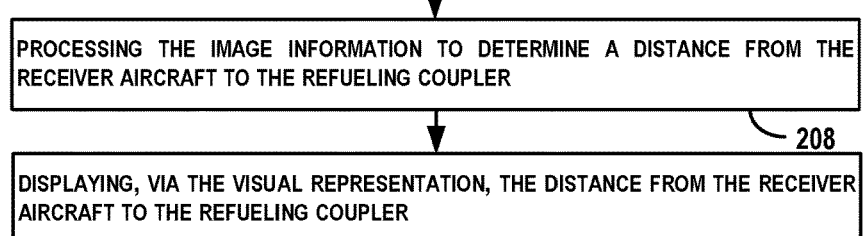
FIG. 17 depicts additional or alternative functions that can be performed in connection with the method shown in FIG. 16, according to an example implementation.

FIG. 17 depicts additional or alternative functions that can be performed in connection with the method 200 shown in FIG. 16. As shown in FIG. 17, at block 208, the method 200 can further include processing the image information to determine a distance from the receiver aircraft 112 to the refueling coupler 130, and at block 210, displaying, via the visual representation 172, the distance from the receiver aircraft 112 to the refueling coupler 130.

Figure 18:
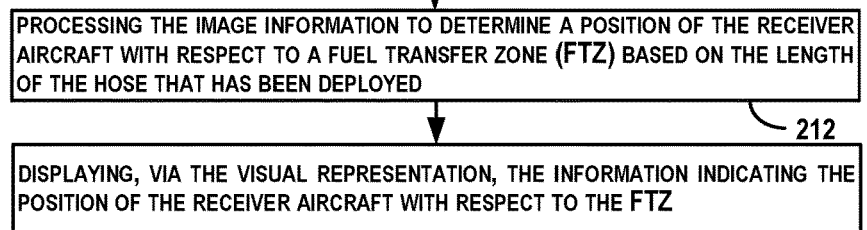
FIG. 18 depicts additional or alternative functions that can be performed in connection with the method shown in FIG. 16, according to an example implementation.

FIG. 18 depicts additional or alternative functions that can be performed in connection with the method 200 shown in FIG. 16. As shown in FIG. 18, at block 212, the method 200 can further include processing the image information to determine a position of the receiver aircraft 112 with respect to the FTZ 133 based on the length of the hose 122 that has been deployed, and at block 214, displaying, via the visual representation 172, the information indicating the position of the receiver aircraft 112 with respect to the FTZ 133.

Figure 19:
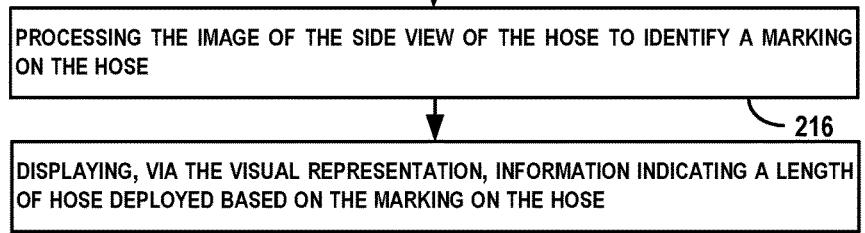
FIG. 19 depicts additional or alternative functions that can be performed in connection with the method shown in FIG. 16, according to an example implementation.

FIG. 19 depicts additional or alternative functions that can be performed in connection with the method 200 shown in FIG. 16. As shown in FIG. 19, at block 216, the method 200 can further include processing the image of the side view of the hose 122 to identify a marking on the hose 122, and at block 218, displaying, via the visual representation 172, information indicating a length of hose 122 deployed based on the marking on the hose 122.

Figure 20:
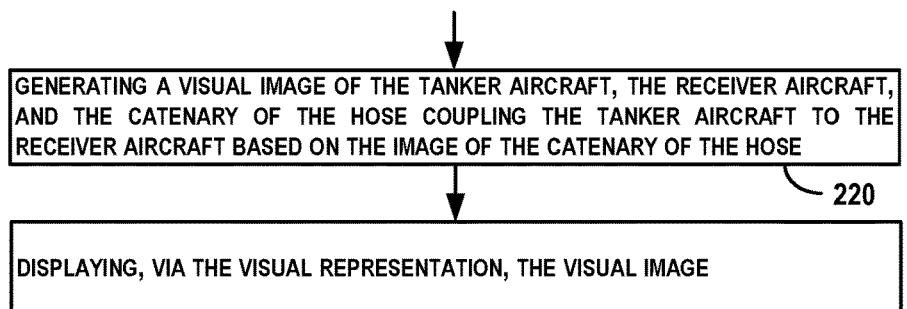
FIG. 20 depicts additional or alternative functions that can be performed in connection with the method shown in FIG. 16, according to an example implementation.

FIG. 20 depicts additional or alternative functions that can be performed in connection with the method 200 shown in FIG. 16. As shown in FIG. 20, at block 220, the method 200 can further include generating a visual image of the tanker aircraft 110, the receiver aircraft 112, and the catenary of the hose 122 coupling the tanker aircraft 110 to the receiver aircraft 112 based on the image of the catenary of the hose 122, and at block 222, displaying, via the visual representation 172, the visual image.

Figure 21:
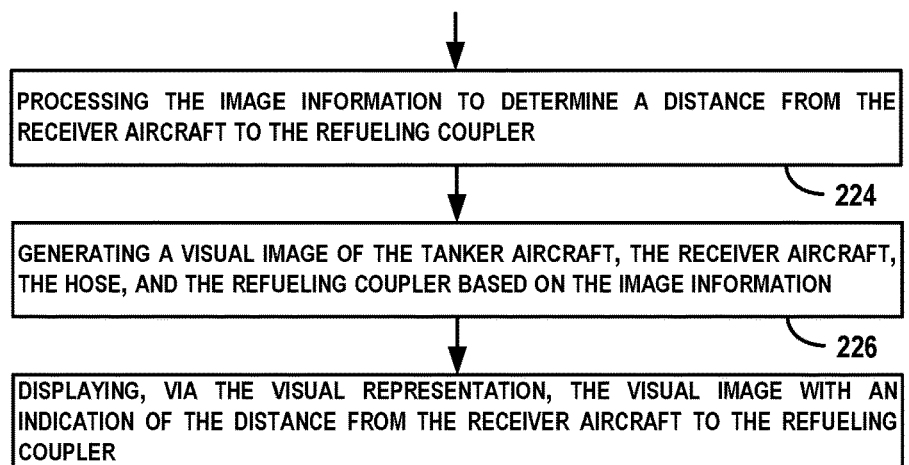
FIG. 21 depicts additional or alternative functions that can be performed in connection with the method shown in FIG. 16, according to an example implementation.

FIG. 21 depicts additional or alternative functions that can be performed in connection with the method 200 shown in FIG. 16. As shown in FIG. 21, at block 224, the method 200 can further include processing the image information to determine a distance from the receiver aircraft 112 to the refueling coupler 130. At block 226, generating a visual image of the tanker aircraft 110, the receiver aircraft 112, the hose 122, and the refueling coupler 130 based on the image information. At block 228, displaying, via the visual representation 172, the visual image with an indication of the distance from the receiver aircraft 112 to the refueling coupler 130. Within examples, the visual image can be provided for display as the visual representation 172 with an indication of the distance from the receiver aircraft 112 to the refueling coupler 130.

The distance between the receiver aircraft 112 and the tanker aircraft 110 can also simply be based on the length of the hose 122 deployed plus additional unknown/estimated distance (when no contact of the refueling coupler 130 to the probe 128 is detected). In this example, the visual representation 172 can be generated to include graphics that change in intensity (get brighter or dimmer) as the receiver aircraft 112 becomes closer to or farther from the tanker aircraft 110. In another example, the refueling information indicates the distance between the receiver aircraft 112 and the tanker aircraft 110, and the display processor(s) 152 generate the visual representation 172 to blink at different frequencies indicating whether the distance between the receiver aircraft 112 and the tanker aircraft 110 is increasing or decreasing.

Figure 22:
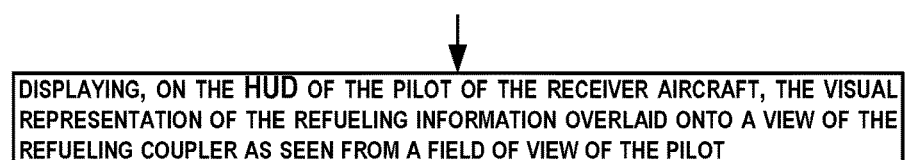
FIG. 22 depicts additional or alternative functions that can be performed in connection with the method shown in FIG. 16, according to an example implementation.

FIG. 22 depicts additional or alternative functions that can be performed in connection with the method 200 shown in FIG. 16. As shown in FIG. 22, at block 230, the method 200 can further include displaying, on the HUD 156 of the pilot 158 of the receiver aircraft 112, the visual representation 172 of the refueling information overlaid onto a view of the refueling coupler 130 as seen from a field of view of the pilot 158.

Figure 23:
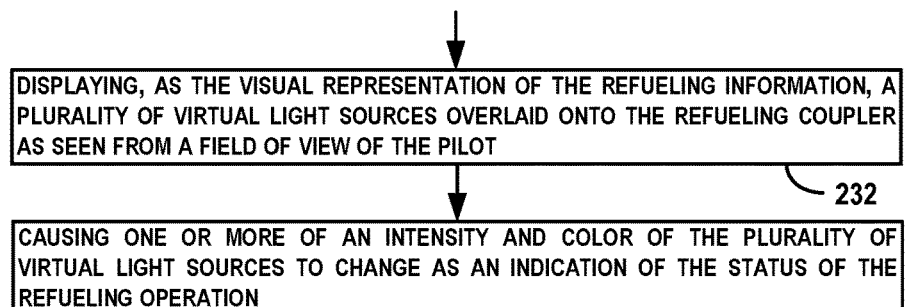
FIG. 23 depicts additional or alternative functions that can be performed in connection with the method shown in FIG. 16, according to an example implementation.

FIG. 23 depicts additional or alternative functions that can be performed in connection with the method 200 shown in FIG. 16. As shown in FIG. 23, at block 232, the method 200 can further include displaying, as the visual representation 172 of the refueling information, a plurality of virtual light sources overlaid onto the refueling coupler 130 as seen from a field of view of the pilot 158, and at block 234 causing one or more of an intensity and color of the plurality of virtual light sources to change as an indication of the status of the refueling operation.

Figure 24:
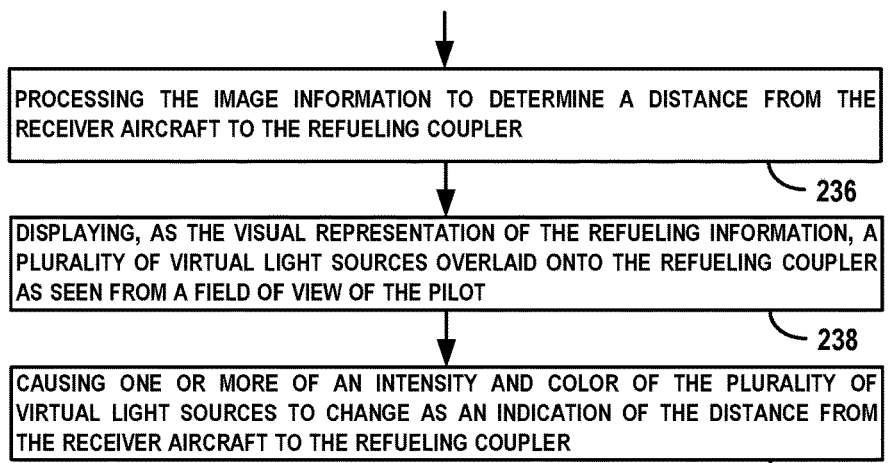
FIG. 24 depicts additional or alternative functions that can be performed in connection with the method shown in FIG. 16, according to an example implementation.

FIG. 24 depicts additional or alternative functions that can be performed in connection with the method 200 shown in FIG. 16. As shown in FIG. 24, at block 236, the method 200 can further include processing the image information to determine a distance from the receiver aircraft 112 to the refueling coupler 130, at block 238, displaying, as the visual representation 172 of the refueling information, a plurality of virtual light sources overlaid onto the refueling coupler 130 as seen from a field of view of the pilot 158, and at block 240, causing one or more of an intensity and color of the plurality of virtual light sources to change as an indication of the distance from the receiver aircraft 112 to the refueling coupler 130.

Figure 25:
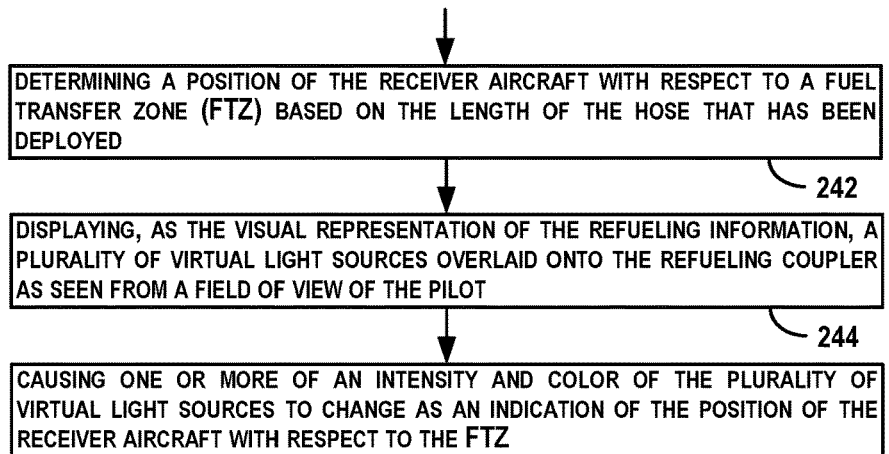
FIG. 25 depicts additional or alternative functions that can be performed in connection with the method shown in FIG. 16, according to an example implementation.

FIG. 25 depicts additional or alternative functions that can be performed in connection with the method 200 shown in FIG. 16. As shown in FIG. 25, at block 242, the method 200 can further include determining a position of the receiver aircraft 112 with respect to the FTZ 133 based on the length of the hose 122 that has been deployed, displaying, as the visual representation 172 of the refueling information, a plurality of virtual light sources overlaid onto the refueling coupler 130 as seen from a field of view of the pilot 158, and causing one or more of an intensity and color of the plurality of virtual light sources to change as an indication of the position of the receiver aircraft 112 with respect to the FTZ 133.

Figure 26:
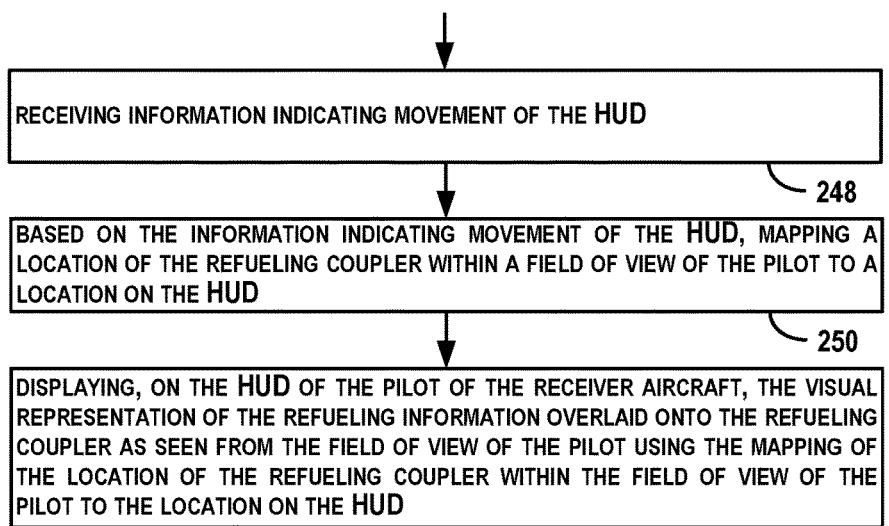
FIG. 26 depicts additional or alternative functions that can be performed in connection with the method shown in FIG. 16.

FIG. 26 depicts additional or alternative functions that can be performed in connection with the method 200 shown in FIG. 16. As shown in FIG. 26, at block 248, the method 200 can further include receiving information indicating movement of the HUD 156, at block 250, based on the information indicating movement of the HUD 156, mapping a location of the refueling coupler 130 within a field of view of the pilot 158 to a location on the HUD 156, and at block 252 displaying, on the HUD 156 of the pilot 158 of the receiver aircraft 112, the visual representation 172 of the refueling information overlaid onto the refueling coupler 130 as seen from the field of view of the pilot 158 using the mapping of the location of the refueling coupler 130 within the field of view of the pilot 158 to the location on the HUD 156.

Any of the blocks shown in FIGS. 16-26 may represent a module, a segment, or a portion of program code, which includes one or more instructions executable by a processor, such as the display processor(s) 152 and/or the vision system processor(s) 154, for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

Within examples, a non-transitory computer readable medium has stored therein instructions, that when executed by one or more processors cause the one or more processors to perform functions for providing information to a pilot of a receiver aircraft during a refueling operation.

In some instances, components of the devices and/or systems described herein may be configured to perform the functions such that the components are actually configured and structured (with hardware and/or software) to enable such performance. Example configurations then include one or more processors executing instructions to cause the system to perform the functions. Similarly, components of the devices and/or systems may be configured so as to be arranged or adapted to, capable of, or suited for performing the functions, such as when operated in a specific manner.

In FIGS. 16-26, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 16-26 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

By the term "substantially" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for providing information to a pilot of a receiver aircraft during a refueling operation, wherein a tanker aircraft includes a hose for supplying fuel to the receiver aircraft and a refueling coupler coupled to an end of the hose, the method comprising:
   receiving, from a vision system located at the receiver aircraft, image information indicative of the hose and the refueling coupler, wherein the image information includes an image of a side view of the hose;
   processing the image of the side view of the hose to identify a marking on the hose; and
   displaying, on a head up display (HUD) of the pilot of the receiver aircraft, a visual representation of information indicating a length of hose deployed based on the marking on the hose.

2. The method of claim 1, wherein receiving, from the vision system located at the receiver aircraft, the image information comprises receiving from a camera real-time images of the hose and the refueling coupler.

3. The method of claim 1, wherein receiving, from the vision system located at the receiver aircraft, the image information comprises receiving real-time data indicative of the hose and the refueling coupler from a LIDAR (light detection and ranging) device.

4. The method of claim 1, wherein receiving, from the vision system located at the receiver aircraft, the image information comprises receiving an image of a catenary of the hose, and the method comprises:
   displaying, via the visual representation, the catenary of the hose.

5. The method of claim 1, further comprising:
   processing the image information to determine a distance from the receiver aircraft to the refueling coupler; and
   displaying, via the visual representation, the distance from the receiver aircraft to the refueling coupler.

6. The method of claim 1, wherein receiving, from the vision system located at the receiver aircraft, the image information comprises receiving an image of a catenary of the hose, and the method further comprises:
   generating a visual image of the tanker aircraft, the receiver aircraft, and the catenary of the hose coupling the tanker aircraft to the receiver aircraft based on the image of the catenary of the hose; and
   displaying, via the visual representation, the visual image.

7. A method for providing information to a pilot of a receiver aircraft during a refueling operation, wherein a tanker aircraft includes a hose for supplying fuel to the receiver aircraft and a refueling coupler coupled to an end of the hose, the method comprising:
   receiving, from a vision system located at the receiver aircraft, image information indicative of the hose and the refueling coupler, wherein the image information includes an image of the hose and an image of the refueling coupler;
   processing the image information to determine a distance from the receiver aircraft to the refueling coupler;
   generating a visual image of the tanker aircraft, the receiver aircraft, the hose, and the refueling coupler based on the image information; and
   displaying, on a head up display (HUD) of the pilot of the receiver aircraft, a visual representation of the visual image with an indication of the distance from the receiver aircraft to the refueling coupler.

8. The method of claim 7, wherein receiving, from the vision system located at the receiver aircraft, the image information comprises receiving from a camera real-time images of the hose and the refueling coupler.

9. The method of claim 7, wherein receiving, from the vision system located at the receiver aircraft, the image information comprises receiving real-time data indicative of the hose and the refueling coupler from a LIDAR (light detection and ranging) device.

10. The method of claim 7, further comprising:
    displaying, via the visual representation, a plurality of virtual light sources overlaid onto the refueling coupler as seen from a field of view of the pilot; and
    causing one or more of an intensity and color of the plurality of virtual light sources to change as an indication of the distance from the receiver aircraft to the refueling coupler.

11. The method of claim 7, further comprising:
    receiving information indicating movement of the HUD;
    based on the information indicating movement of the HUD, mapping a location of the refueling coupler within a field of view of the pilot to a location on the HUD; and
    displaying, on the HUD of the pilot of the receiver aircraft, the visual representation overlaid onto the refueling coupler as seen from the field of view of the pilot using the mapping of the location of the refueling coupler within the field of view of the pilot to the location on the HUD.

12. A method for providing information to a pilot of a receiver aircraft during a refueling operation, wherein a tanker aircraft includes a hose for supplying fuel to the receiver aircraft and a refueling coupler coupled to an end of the hose, the method comprising:
    receiving, at a first transceiver located at the receiver aircraft, refueling information from a second transceiver located at the tanker aircraft;

receiving, from a vision system located at the receiver aircraft, image information indicative of the hose and the refueling coupler;

processing the image information to track a position of the refueling coupler; and displaying, on a head up display (HUD) of the pilot of the receiver aircraft, a visual representation of the refueling information overlaid onto a view of the refueling coupler as seen from a field of view of the pilot based on mapping the visual representation to the position of the refueling coupler.

13. The method of claim 12, wherein receiving, from the vision system located at the receiver aircraft, the image information comprises receiving from a camera real-time images of the hose and the refueling coupler.

14. The method of claim 12, wherein receiving, from the vision system located at the receiver aircraft, the image information comprises receiving real-time data indicative of the hose and the refueling coupler from a LIDAR (light detection and ranging) device.

15. The method of claim 12, wherein the refueling information comprises a status of the refueling operation, and the method further comprises:

displaying, as the visual representation of the refueling information, a plurality of virtual light sources overlaid onto the refueling coupler as seen from a field of view of the pilot; and causing one or more of an intensity and color of the plurality of virtual light sources to change as an indication of the status of the refueling operation.

16. The method of claim 12, further comprising:

processing the image information to determine a distance from the receiver aircraft to the refueling coupler;

displaying, as the visual representation of the refueling information, a plurality of virtual light sources overlaid onto the refueling coupler as seen from a field of view of the pilot; and causing one or more of an intensity and color of the plurality of virtual light sources to change as an indication of the distance from the receiver aircraft to the refueling coupler.

17. The method of claim 12, wherein the refueling information comprises a length of the hose that has been deployed, and the method further comprises:

determining a position of the receiver aircraft with respect to a fuel transfer zone (FTZ) based on the length of the hose that has been deployed;

displaying, as the visual representation of the refueling information, a plurality of virtual light sources overlaid onto the refueling coupler as seen from a field of view of the pilot; and causing one or more of an intensity and color of the plurality of virtual light sources to change as an indication of the position of the receiver aircraft with respect to the FTZ.

18. A method for providing information to a receiver aircraft during a refueling operation, wherein a tanker aircraft includes a hose for supplying fuel to the receiver aircraft and a refueling coupler coupled to an end of the hose, the method comprising:

receiving, at a first transceiver located at the receiver aircraft, refueling information from a second transceiver located at the tanker aircraft, wherein the refueling information comprises a length of the hose that has been deployed;

receiving, from a vision system located at the receiver aircraft, image information indicative of the hose and the refueling coupler;

processing the image information to determine a position of the receiver aircraft with respect to a fuel transfer zone (FTZ) based on the length of the hose that has been deployed; and outputting a status of the refueling operation based on the position of the receiver aircraft with respect to the FTZ.

19. The method of claim 18, wherein receiving, from the vision system located at the receiver aircraft, the image information comprises receiving from a camera real-time images of the hose and the refueling coupler.

20. The method of claim 18, wherein receiving, from the vision system located at the receiver aircraft, the image information comprises receiving real-time data indicative of the hose and the refueling coupler from a LIDAR (light detection and ranging) device.

* * * * *